(12) United States Patent
Waldner

(10) Patent No.: US 12,012,717 B2
(45) Date of Patent: Jun. 18, 2024

(54) EARTH WORKING IMPLEMENT

(71) Applicant: OCFab Ltd., Minnedosa (CA)

(72) Inventor: Micheal Justin Waldner, Minnedosa (CA)

(73) Assignee: OCFab Ltd., Minnedosa (CA)

( * ) Notice: Subject to any disclaimer, the term of this patent is extended or adjusted under 35 U.S.C. 154(b) by 683 days.

(21) Appl. No.: 17/164,124

(22) Filed: Feb. 1, 2021

(65) Prior Publication Data
US 2021/0310212 A1 Oct. 7, 2021

Related U.S. Application Data

(60) Provisional application No. 63/005,512, filed on Apr. 6, 2020.

(51) Int. Cl.
| E02F 3/76 | (2006.01) |
| E02F 3/815 | (2006.01) |
| E02F 3/84 | (2006.01) |
| E02F 5/02 | (2006.01) |
| E02F 9/08 | (2006.01) |

(52) U.S. Cl.
CPC .......... *E02F 3/7604* (2013.01); *E02F 3/7672* (2013.01); *E02F 3/8155* (2013.01); *E02F 3/844* (2013.01); *E02F 5/027* (2013.01); *E02F 9/0808* (2013.01)

(58) Field of Classification Search
CPC ..... E02F 3/7604; E02F 3/7672; E02F 3/8155; E02F 3/844; E02F 5/027; E02F 9/0808; A01B 13/00; A01B 13/02
See application file for complete search history.

(56) References Cited

U.S. PATENT DOCUMENTS

| 3,327,413 | A | * | 6/1967 | Brinkmeyer | ............ | E02F 3/765 |
| | | | | | | 180/419 |
| 3,512,589 | A | * | 5/1970 | Ulrich | ...................... | E02F 3/815 |
| | | | | | | 172/791 |
| 3,724,557 | A | * | 4/1973 | Boschung | .............. | E02F 3/7663 |
| | | | | | | 172/197 |
| 3,907,041 | A | * | 9/1975 | Manor | .................... | E02F 3/844 |
| | | | | | | 172/705 |
| 4,217,962 | A | * | 8/1980 | Schaefer | ............... | E02F 3/6454 |
| | | | | | | 172/197 |

(Continued)

Primary Examiner — Adam J Behrens
Assistant Examiner — Blake E Scoville
(74) Attorney, Agent, or Firm — Ryan W. Dupuis; Kyle R. Satterthwaite; Ade & Company Inc.

(57) ABSTRACT

An earth working implement has a main frame, a main blade supported on the main frame transversely to the forward direction, and two wing blades pivotally supported at opposing ends of the main blade for movement between forward and rearward projecting orientations. A tilt actuator controls angular orientation of the main blade relative to the main frame about a lateral axis. Two rear wheels support the rear end of the frame for rolling along the ground. A hitch arm extends forwardly from a pivotal connection of the main frame for connection to a towing vehicle so as to vary in angular orientation relative to the main frame independently of the main blade. Furrow openers in a laterally spaced apart row are movable relative to the main frame between a working position protruding below the cutting edge of the main blade and a raised storage position.

24 Claims, 16 Drawing Sheets

(56) References Cited

U.S. PATENT DOCUMENTS

| | | | | |
|---|---|---|---|---|
| 4,834,191 | A * | 5/1989 | Vecchio | E02F 3/815 |
| | | | | 172/784 |
| 4,898,247 | A * | 2/1990 | Springfield | E02F 3/7668 |
| | | | | 172/477 |
| 5,289,880 | A * | 3/1994 | Barto | E02F 3/7663 |
| | | | | 172/684.5 |
| 5,890,546 | A * | 4/1999 | Kerpash, Sr. | E02F 3/7663 |
| | | | | 172/776 |
| 6,273,198 | B1 * | 8/2001 | Bauer | E02F 3/7613 |
| | | | | 172/825 |
| 7,942,209 | B1 * | 5/2011 | Volz | E02F 3/8155 |
| | | | | 172/197 |
| 8,732,993 | B2 * | 5/2014 | Hruska | E02F 3/7604 |
| | | | | 37/372 |
| 8,813,864 | B2 * | 8/2014 | Layton | A01B 63/004 |
| | | | | 172/311 |
| 10,011,972 | B2 * | 7/2018 | Helmeczi | E02F 3/8155 |
| 2016/0194853 | A1 * | 7/2016 | Sawatsky | E02F 9/024 |
| | | | | 172/799.5 |

* cited by examiner

EARTH WORKING IMPLEMENT

This application claims the benefit under 35 U.S.C. 119(e) of U.S. provisional application Ser. No. 63/005,512, filed Apr. 6, 2020.

FIELD OF THE INVENTION

The present invention relates to an earth working implement for moving earth, for example to form ditches or other shaping of the surface of the ground, when towed across the ground in a forward working direction by a towing vehicle.

BACKGROUND

In the agricultural industry, in many instances it is desirable to move and shape earth to vary ground contours for various purposes. This may include forming ditches to allow drainage of precipitation which collects on agricultural fields, levelling of ridges or ditches to evenly distribute precipitation, or forming ridges and embankments to control the direction of precipitation or to form a collection pond for example.

In some instances, earth can be shaped and moved using a straight blade in a bulldozing configuration together with wings extending forwardly from opposing ends of the straight blade to assist in collection of material by the straight blade.

U.S. Pat. No. 10,011,972 by Helmeczi et al and U.S. Pat. No. 8,732,993 by Hruska et al discloses two examples of an earth moving blade with forward projecting wings. In U.S. Pat. No. 10,011,972 the angle of the wings can be adjusted slightly; however, in all instances in both U.S. Pat. Nos. 10,011,972 and 8,732,993 the wings remain forwardly oriented relative to a straight blade section connected therebetween such that the earth moving blade is again limited to a single use of collecting and spreading material cut from the ground. Furthermore, the blade is fixed in orientation relative to the hitch arm in each instance such that the orientation of the blade and wings about a lateral tilt axis cannot be adjusted independently of the depth of the blades.

SUMMARY OF THE INVENTION

According to one aspect of the invention there is provided an earth working implement for moving earth when towed across ground in a forward working direction by a towing vehicle, the earth working implement comprising:
- a main frame defining a longitudinal axis extending in the forward working direction from a rear end to a front end of the frame;
- a main blade supported on the main frame, the main blade having a leading face that is upright in orientation and that terminates at a bottom cutting edge oriented in a lateral direction transversely to the forward working direction;
- the main blade being pivotal relative to the main frame about a tilt axis oriented in the lateral direction, the tilt axis being located rearwardly of the leading face of the main blade;
- a tilt actuator operatively connected between the main blade and the main frame so as to controllably vary angular orientation of the main blade relative to the main frame about the tilt axis;
- two rear wheels operatively connected to the main frame at a location spaced rearwardly from the main blade so as to be arranged to support the main frame for rolling movement along the ground in the forward working direction;
- a hitch arm connected to the main frame for pivotal connection relative to the main frame about a hitching axis oriented in the lateral direction;
- the hitch arm extending in the forward working direction from the hitching axis to a hitch connector at a forward end of the hitch arm that is arranged for connection to the towing vehicle;
- a hitch actuator operatively connected between the hitch arm and the main frame so as to controllably vary angular orientation of the hitch arm relative to the main frame about the tilt axis;
- the hitch actuator being operable independently of the tilt actuator.

By independently controlling the angular orientation of the main blade and the angular orientation of the hitch arm relative to the main frame, the operator can independently control the cutting depth of the main blade and the aggressiveness of the cutting action of the main blade relative to the ground. When further providing wing blades which are angularly offset from the main blade, adjusting the blade tilt also allows the contour of the earth moving by the blades to be controlled independently of the depth of the blades using independent blade tilt and hitch arm pivot controls.

Preferably the implement further includes a pair of wing blades supported at laterally opposing ends of the main blade respectively, each wing blade having a leading face extending upwardly from a bottom cutting edge of the wing blade, each wing blade being pivotal relative to the main blade about a respective upright wing axis so as to vary an angular orientation of the bottom cutting edge of the wing blade relative to the bottom cutting edge of the main blade, and each wing blade being carried on the main blade so as to be pivotal relative to the main frame about the tilt axis together with the main blade under control of the tilt actuator. Preferably a wing actuator is operatively connected between each wing blade and the main blade so as to controllably vary angular orientation of the wing blade relative to the main blade about the upright axis in which the wing actuators are operable independently of one another.

Preferably a rear wheel frame is coupled to the main frame and supports the two rear wheels thereon, in which the rear wheels are pivotal together with the rear wheel frame relative to the main frame about a frame axis oriented in the forward working direction. In this instance, one or more frame actuators are operatively connected between the main frame and the rear wheel frame so as to be arranged to controllably vary an angular orientation of the rear wheel frame relative to the main frame about the frame axis.

The implement may further include two extension frames supporting the two rear wheels on the rear wheel frame respectively, in which the extension frames are slidable relative to the rear wheel frame in the lateral direction so as to be arranged to vary a width between the rear wheels in the lateral direction.

The implement may further include two axle bodies supporting the two rear wheels relative to the rear wheel frame respectively, in which each axle body is pivotal relative to the rear wheel frame about a respective upright steering axis. Preferably the axle bodies rotatably supporting the respective wheels thereon such that each rear wheel and the respective axle body are pivotal together relative to the rear wheel frame about the upright steering axis.

According to a second aspect of the present invention there is provided an earth working implement for moving earth when towed across ground in a forward working direction by a towing vehicle, the earth working implement comprising:
- a main frame defining a longitudinal axis extending in the forward working direction from a rear end to a front end of the frame;
- a main blade supported on the main frame, the main blade having a leading face that is upright in orientation and that terminates at a bottom cutting edge oriented in a lateral direction transversely to the forward working direction;
- the main blade being pivotal relative to the main frame about a tilt axis oriented in the lateral direction, the tilt axis being located rearwardly of the leading face of the main blade;
- a tilt actuator operatively connected between the main blade and the main frame so as to controllably vary angular orientation of the main blade relative to the main frame about the tilt axis;
- two rear wheels operatively connected to the main frame at a location spaced rearwardly from the main blade so as to be arranged to support the main frame for rolling movement along the ground in the forward working direction;
- a hitch arm connected to the main frame and extending in the forward working direction from the main frame to a hitch connector at a forward end of the hitch arm that is arranged for connection to the towing vehicle;
- a pair of wing blades supported at laterally opposing ends of the main blade respectively, each wing blade having a leading face extending upwardly from a bottom cutting edge of the wing blade, each wing blade being pivotal relative to the main blade about a respective upright wing axis so as to vary an angular orientation of the bottom cutting edge of the wing blade relative to the bottom cutting edge of the main blade, and each wing blade being carried on the main blade so as to be pivotal relative to the main frame about the tilt axis together with the main blade under control of the tilt actuator;
- the implement being operable in a forward ditch forming configuration wherein the wing blades are positioned to extend rearwardly from the main blade and the main blade is tilted forwardly from the bottom cutting edge of the main blade such that the bottom cutting edges of the wing blades extend laterally outwardly from the main blade at an upward slope from the bottom cutting edge of the main blade; and
- the implement being operable in a rearward ditch forming configuration wherein the wing blades are positioned to extend forwardly from the main blade and the main blade is tilted rearwardly from the bottom cutting edge of the main blade such that the bottom cutting edges of the wing blades extend laterally outwardly from the main blade at an upward slope from the bottom cutting edge of the main blade.

The combination of wing blades that pivot through a range of forward and rearward orientations relative to the main blade, preferably independently of one another, together with a main blade that can tilt about a lateral tilt axis allows a large variety of contours to be formed and a large variety of different earth moving configurations to be achieved in a manner unseen in the prior art.

Preferably the tilt axis and the hitch axis are coaxial with one another.

When the hitch arm comprises a forward portion supporting the hitch connector thereon and two rearward portions extending rearwardly and downwardly from the forward portion, the two rearward portions may be pivotally coupled to the main frame at laterally spaced apart locations along the hitch axis.

The implement may include a pair of wing blades supported at laterally opposing ends of the main blade respectively, in which each wing blade has a leading face extending upwardly from a bottom cutting edge of the wing blade, and in which each wing blade is pivotal relative to the main blade about a respective upright wing axis so as to vary an angular orientation of the bottom cutting edge of the wing blade relative to the bottom cutting edge of the main blade. In this instance, each wing blade may be carried on the main blade so as to be pivotal relative to the main frame about the tilt axis together with the main blade under control of the tilt actuator.

The implement may include a wing actuator operatively connected between each wing blade and the main blade so as to controllably vary angular orientation of the wing blade relative to the main blade about the upright axis, in which the wing actuators are operable independently of one another.

Each wing blade may be pivotal into a forward position extending forwardly of the main blade so as to be oriented substantially parallel to the forward working direction.

When each wing actuator is coupled between the main blade and the respective wing blade by a wing linkage, the wing linkage may further comprise: (i) a first link member pivotally coupled at a first end of the first link member on a rear side of the wing blade, in which the wing actuator is a linear actuator pivotally coupled at a first end of the wing actuator on a rear side of the main blade and pivotally coupled at a second end on the first link member spaced from the first end of the first link member; and (ii) a second link member pivotally coupled at a first end of the second link member at a rear side of the main blade at a location spaced from the respective wing axis and pivotally coupled at a second end of the second link member on the first link member at an intermediate location between first end of the first link member and the second end of the wing actuator.

Each wing blade may be pivotal into a rearward position extending laterally outward from the main blade at a rearward slope oriented less than 70 degrees from the forward working direction. More particularly, the rearward slope of each wing blade in the rearward position may be approximately 60 degrees from the forward working direction.

The implement may be operable in a ridge forming configuration in which the wing blades are positioned to extend forwardly from the main blade and the main blade is tilted forwardly from the bottom cutting edge of the main blade such that the bottom cutting edges of the wing blades extend laterally outwardly from the main blade at a downward slope from the bottom cutting edge of the main blade.

The implement may also be operable in a rearward ditch forming configuration wherein the wing blades are positioned to extend rearwardly from the main blade and the main blade is tilted forwardly from the bottom cutting edge of the main blade such that the bottom cutting edges of the wing blades extend laterally outwardly from the main blade at an upward slope from the bottom cutting edge of the main blade.

The implement may be further operable in a forward ditch forming configuration wherein the wing blades are positioned to extend forwardly from the main blade and the main blade is tilted rearwardly from the bottom cutting edge of the main blade such that the bottom cutting edges of the wing blades extend laterally outwardly from the main blade at an upward slope from the bottom cutting edge of the main blade.

The implement may further include a rear wheel frame coupled to the main frame and supporting the two rear wheels thereon, in which the rear wheels are pivotal together with the rear wheel frame relative to the main frame about a frame axis oriented in the forward working direction.

The implement may further include at least one frame actuator operatively connected between the main frame and the rear wheel frame so as to be arranged to controllably vary an angular orientation of the rear wheel frame relative to the main frame about the frame axis.

When the implement includes a rear wheel frame coupled to the main frame, the implement may further include two extension frames supporting the two rear wheels on the rear wheel frame respectively, in which the extension frames are slidable relative to the rear wheel frame in the lateral direction so as to be arranged to vary a width between the rear wheels in the lateral direction.

When the implement includes a rear wheel frame coupled to the main frame, the implement may further include two axle bodies supporting the two rear wheels relative to the rear wheel frame respectively, in which each axle body is pivotal relative to the rear wheel frame about a respective upright steering axis, and in which the axle body rotatably supports the respective wheel thereon such that the rear wheel and the axle body are pivotal together relative to the rear wheel frame about the upright steering axis.

According to a further aspect of the present invention there is provided an earth working implement for moving earth when towed across ground in a forward working direction by a towing vehicle, the earth working implement comprising:
  a main frame defining a longitudinal axis extending in the forward working direction from a rear end to a front end of the frame;
  a main blade supported on the main frame, the main blade having a leading face that is upright in orientation and that terminates at a bottom cutting edge oriented in a lateral direction transversely to the forward working direction;
  the main blade being pivotal relative to the main frame about a tilt axis oriented in the lateral direction, the tilt axis being located rearwardly of the leading face of the main blade;
  a tilt actuator operatively connected between the main blade and the main frame so as to controllably vary angular orientation of the main blade relative to the main frame about the tilt axis;
  two rear wheels operatively connected to the main frame at a location spaced rearwardly from the main blade so as to be arranged to support the main frame for rolling movement along the ground in the forward working direction;
  a hitch arm connected to the main frame and extending in the forward working direction from the main frame to a hitch connector at a forward end of the hitch arm that is arranged for connection to the towing vehicle; and
  a plurality of furrow openers supported on the main frame at spaced apart positions relative to one another in the lateral direction;
  the furrow openers being movable between a working position and a stored position;
  the furrow openers in the working position protruding below the bottom cutting edge of the main blade so as to be arranged to form respective furrows in the ground as the implement is displaced across the ground in the forward working direction; and
  the furrow openers in the storage position being spaced above the bottom cutting edge of the main blade such that the furrow openers do not engage the ground as the implement is displaced across the ground in the forward working direction.

The use of furrow openers allows the ground to be loosened up by the furrow openers in a first pass of the implement over the ground with the furrow openers in the working position, followed by a second pass with the same implement when the furrow openers are stored to move earth in a manner dictated by the main blade, and optionally the wing blades. The implement according to the present invention is thus much more effective at moving earth when the ground is compacted and hard compared to other earth moving implements relying only on blades that require much higher draft forces to pull through the compacted ground.

Preferably the furrow openers are spaced apart along a toolbar that spans a full width of the main blade in the lateral direction.

The furrow openers are preferably supported on the main frame at a location spaced rearwardly from the main blade.

When the furrow openers are spaced apart along a toolbar, preferably the toolbar is pivotal about a toolbar axis oriented in the lateral direction as the furrow openers are displaced between the working position and the stored position thereof.

The furrow openers may be supported on a furrow frame including a main portion and two wing portions extending laterally outwardly from opposing ends of the main portion in a wide configuration of the wing portions, in which each of the main portion and the wing portions of the furrow frame support a plurality of the furrow openers thereon, and in which the wing portions of the furrow frame are pivotal about respective furrow frame axes oriented in the forward working direction from the wide configuration upwardly and inwardly towards a narrow configuration.

When the furrow openers are supported laterally spaced apart along a toolbar, and the toolbar includes a main section supported on the main portion of the furrow frame and two wing sections supported on the wing portions of the furrow frame, each section of the toolbar may be pivotal relative to the respective portion of the furrow frame about a toolbar axis oriented in the lateral direction as the furrow openers are displaced between the working position and the stored position thereof.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
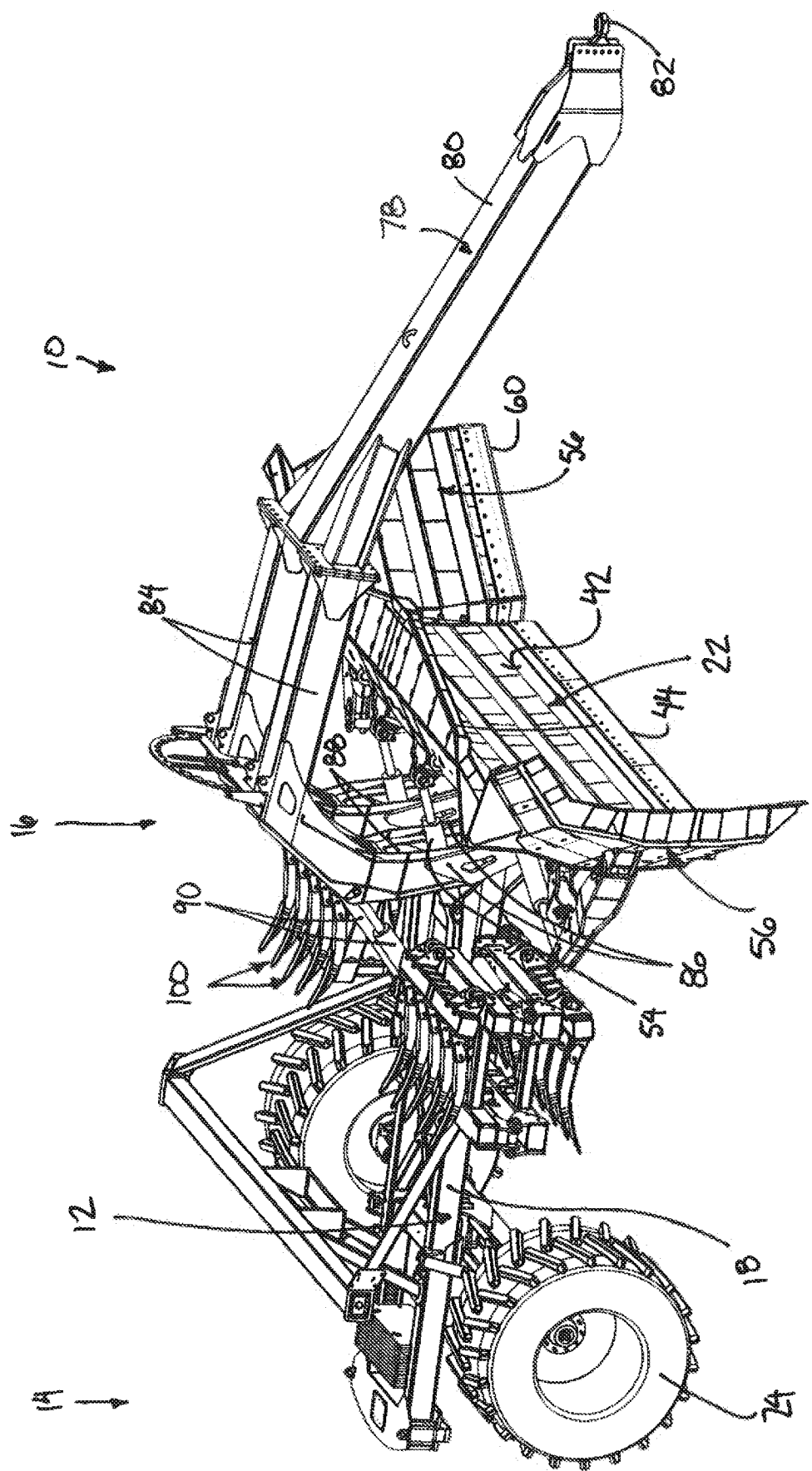
FIGS. 1 and 2 are perspective views of the earth working implement in a level blade configuration with the furrow openers in a stored position.
Figure 2:
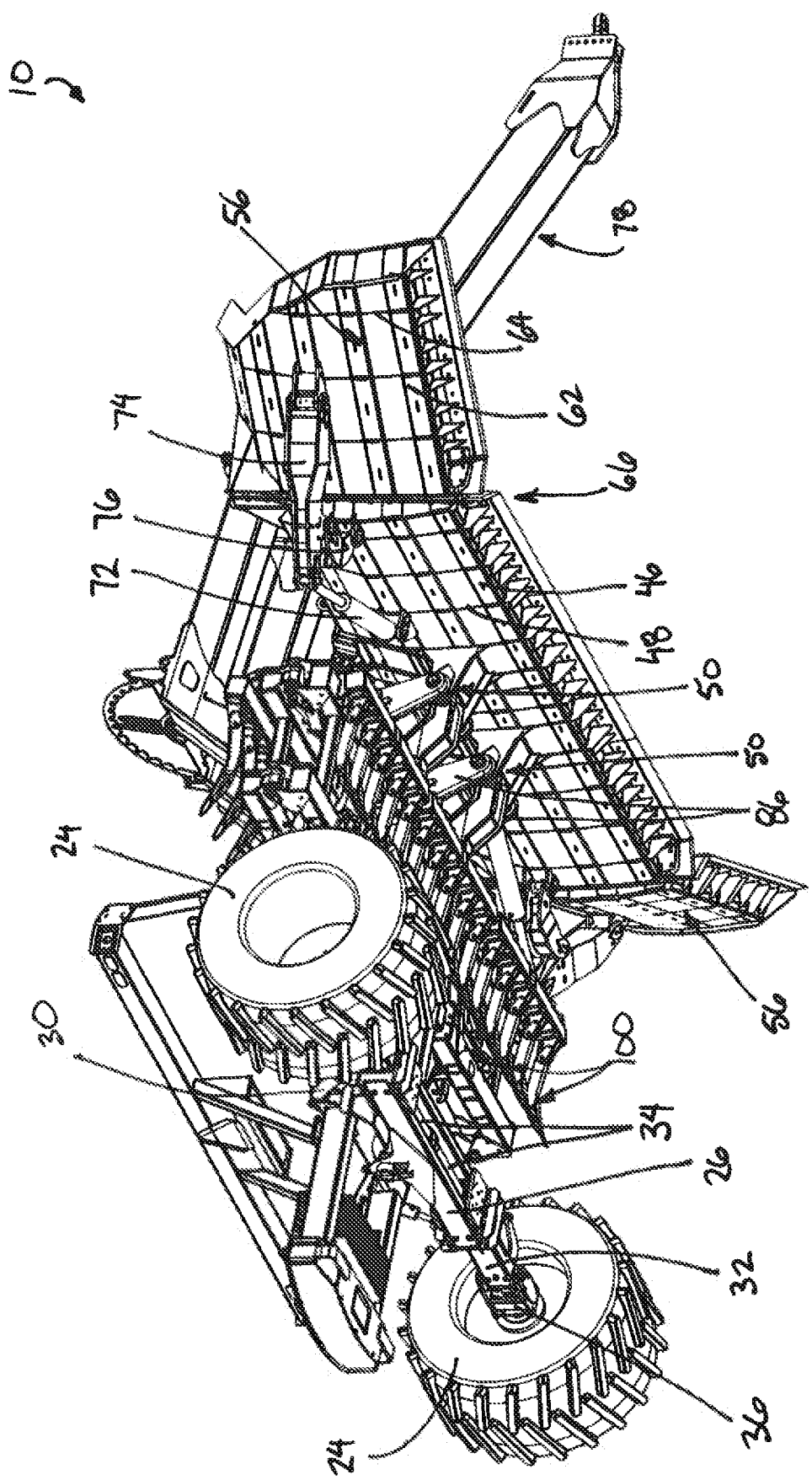
Figure 3:
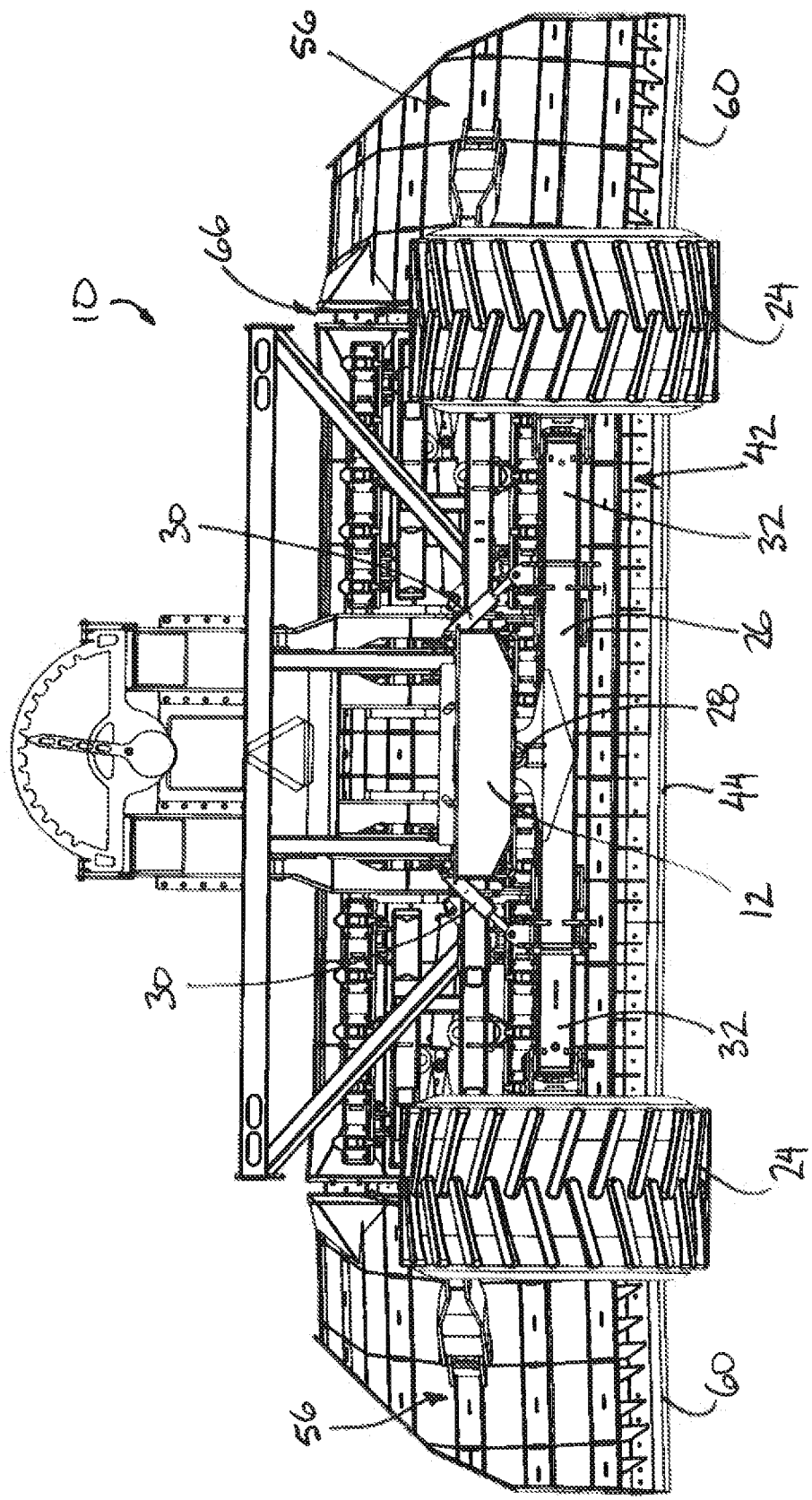
FIGS. 3, 4 and 5 are rear elevational, side elevational, and top plan views respectively of the earth working implement in the level blade configuration according to FIG. 1.
Figure 4:
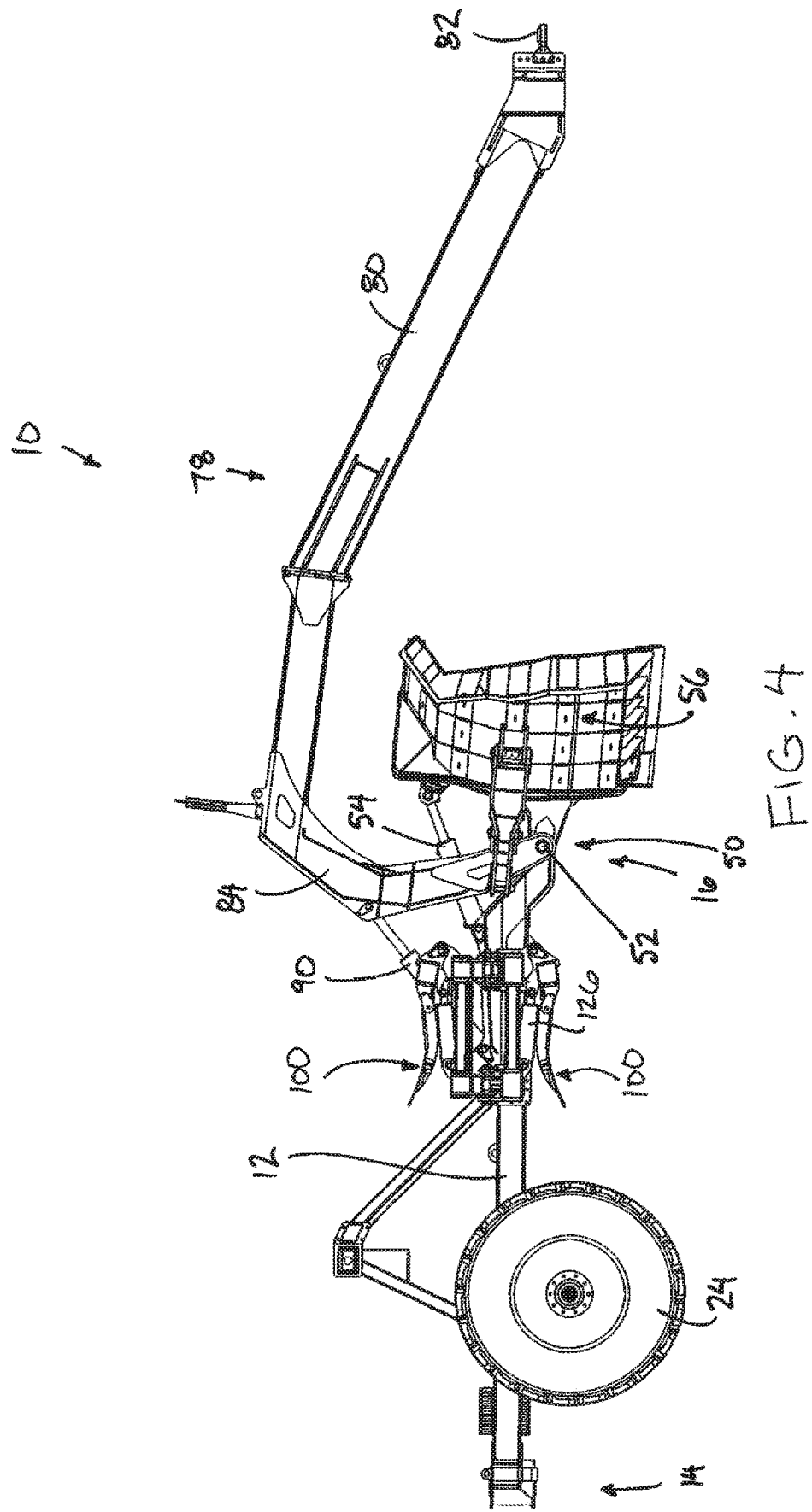
Figure 5:
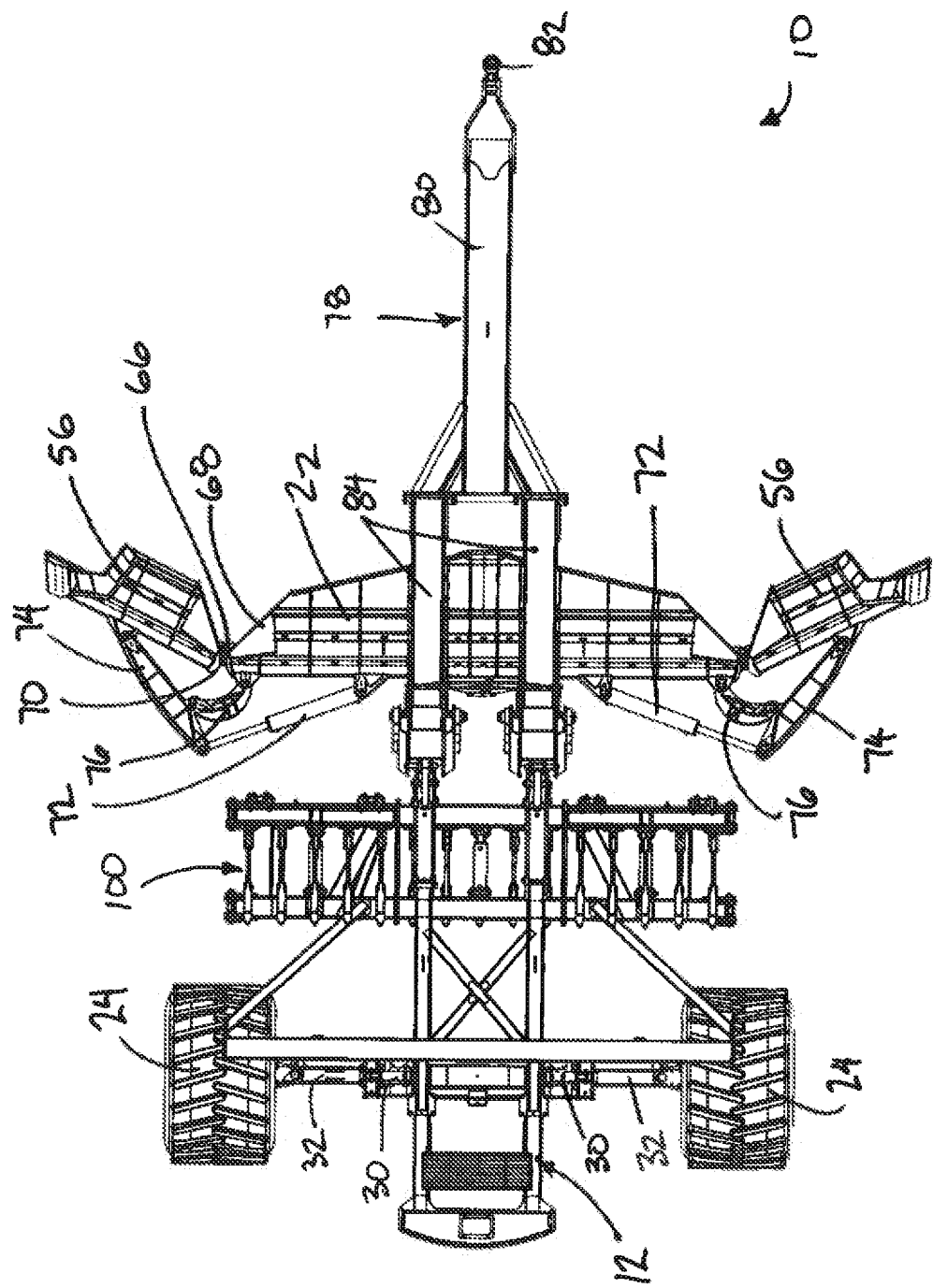

Referring to the accompanying figures, there is illustrated an earth working implement generally indicated by reference numeral 10. The implement 10 is particularly suited for connection to a towing vehicle, for example a tractor, to follow the vehicle across the ground in a forward working direction of the tractor and the implement.

The implement generally includes a main frame 12 extending in the direction of a longitudinal axis of the frame which is oriented in the forward working direction to extend from a rear end 14 of the main frame to a front end 16 of the main frame. The main frame 12 is primarily formed by two main beams 18 extending longitudinally between the front and rear ends of the main frame so as to be parallel to one another and laterally spaced apart from one another in a lateral direction that is perpendicular to the forward working direction. A plurality of cross members 20 are connected in the lateral direction between the main beams 18 at longitudinally spaced apart positions along the main frame.

A main blade 22 is supported on the front ends of the main beams and is the main tool of the implement for moving earth in use. The main blade 22 is a straight blade that is oriented to extend in the lateral direction perpendicularly to the forward working direction. The main blade 22 is described in further detail below.

The implement further includes a rear wheel frame connected to the main frame in proximity to the rear end thereof for carrying two rear wheels 24 relative to the main frame. The rear wheel frame comprises a rear beam 26 supported to extend generally in the lateral direction below the main beams 18. The rear beam 26 is a hollow tubular member of rectangular cross-section. A pivot coupling 28 is connected between the rear beam 26 and one of the cross members 20 of the main frame. The pivot coupling 28 comprises a pivot shaft oriented in the forward working direction to define a frame axis about which the rear wheel frame pivots relative to the main frame. When oriented in a forward rolling direction, the rear wheels 24 are rotatable about a common rear wheel axis oriented perpendicularly to the forward working direction. As the rear wheel frame pivots relative to the main frame, the angular orientation of the rear wheel axes of the rear wheels together with the rear wheel frame is adjusted relative to the main frame.

Two frame actuators 30 are operatively connected between the rear beam 26 and the main frame. More particularly the two frame actuators are pivotally coupled at inner ends onto respective ones of the two main beams 18 such that the frame actuators extend downward and laterally outward away from one another towards opposing ends which are pivotally coupled onto respective ends of the rear beam 26. The frame actuators 30 are hydraulic linear actuators which are hydraulically linked to one another such that extension of one actuator causes the other actuator to retract which in turn causes the rear wheel frame to be pivoted about the frame axis relative to the main frame. Hydraulic controls connected to the frame actuators permit the rear wheel frame to be angularly adjusted and set at any selected desired orientation using the hydraulic controls.

Two extension frames 32 are connected to the rear beam 26 such that each extension frame is slidable in the lateral direction relative to the rear wheel frame. More particularly, each extension frame is a telescoping frame member supported at one end of the rear beam 26 in which the frame member is a tubular member of rectangular cross section that fits within the open end of the rear beam to allow the telescoping frame member to be linearly slidable into and out of the respective end of the rear beam 26.

An extension actuator 34 is associated with each extension frame in the form of a hydraulic linear actuator supported within the tubular frame member 32 of the extension frame. One end of the extension actuator is fixed to the outer end of the telescoping frame member while the opposing end is fixed at a central location within the interior of the rear beam 26 such that extension and retraction of the actuator 34 causes the respective extension frame 32 to be extended and retracted relative to the rear beam 26. The pair of extension actuators 34 are hydraulically linked such that the actuators are extended and retracted together with one another. In this manner the rear wheels carried on the outer ends of the extension frames 32 remain at a similar distance to the lateral centre of the main frame relative to one another as the overall width in the lateral direction between the rear wheels varies.

In a narrow configuration, the extension frames 32 are retracted relative to the rear beam so as to locate the rear wheels adjacent opposing ends of the rear beam. The overall width defined by the rear wheels in this instance is equal to or less than the overall width of the main blade 22 in the lateral direction.

In a wide configuration, the extension actuators 34 are extended together such that the rear wheels are displaced further apart to define an overall width which is wider than the width of the main blade in the lateral direction.

A pair of axle bodies 36 are supported at the outer ends of the two extension frames 32 respectively to support the rear wheels 24 respectively thereon. Each axle body 36 is pivotally coupled to the end of the respective extension frame for pivotal movement of the rear wheel and the respective axle body 36 together relative to the extension frame and the main frame about a respective upright steering axis.

A steer actuator 38 is associated with each axle body to control the position of the axle body and thus the steering orientation of the rear wheels about the steering axes respectively. Each steer actuator 38 is pivotally coupled at one end onto an offset arm 40 on the outer end of the extension frame to protrude forwardly therefrom and is pivotally coupled at the other end on the respective axle body. Hydraulically extending and retracting the steer actuators allows controlled steering of the orientation of the wheels relative to the main frame. The steering actuators 38 are hydraulically linked so as to be inversely proportional to one another such that extension of one of the actuators results in retraction of the other actuator by the same amount such that the two rear wheels are always pivoted together in the same direction away from a normal forward rolling orientation.

The main blade 22 is mounted onto the front ends of the main beams 18 at a forward portion of the main beams which extends downwardly from the remaining main portion of the main beams. In this manner the connection of the main blade 22 onto the main beams occurs at a location which is spaced below the main portion of the main beams.

The main blade 22 includes a front plate 42 defining a leading face of the main blade which is somewhat concave in profile between the top and bottom edges thereof. The plate is generally straight in the lateral direction between opposing ends of the blade. The leading face terminates along the bottom thereof at a bottom cutting edge 44 which is straight across the full width of the main blade. The cutting edge is defined on a replaceable plate protruding below the front plate and which is secured with replaceable fasteners such that the bottom cutting edge can be replaced as it becomes worn. The main blade 22 further includes a plurality of beams 46 and structural ribs 48 extending horizontally and vertically across the rear of the front plate 42 to stiffen and strengthen the front plate and define the rigid shape of the main blade.

Two pivot couplings 50 are provided at laterally spaced apart positions on the rear of the main blade 22 at a spacing corresponding to the spacing between the main beams 18 of the main frame such that each pivot couplings 50 is coupled to the forward end of a respective one of the main beams 18. The pivot couplings are secured to the main blade at a location spaced above the bottom cutting edge of the main blade but nearer to the bottom than the top of the blade. Each pivot coupling comprises a pair of parallel plates which are laterally spaced apart and connected at spaced positions along a horizontal pivot shaft 52 defining the pivot axis of the pivot coupling 50.

The pivot couplings are aligned with one another such that the pivot shafts 52 define a common blade tilt axis about which the main blade pivots relative to the main frame. The main blade can be tilted between a forwardly tilted orientation in which a bottom portion of the blade extends upwardly at a forward inclination from the bottom cutting edge 44 and a rearwardly tilted orientation in which a bottom portion of the blade extends upwardly at a rearward inclination from the bottom cutting edge 44. The connection of the pivot couplings at the rear of the blade which connect to the front end of the main frame ensure that the blade is positioned ahead of and in a leading relationship relative to the main frame.

Two tilt actuators 54 are operatively connected between the main blade and the main frame respectively. More particularly each tilt actuator is a hydraulic linear actuator which is pivotally coupled at a rear end onto the top side of a respective one of the main beams 18 of the main frame to extend upwardly and forwardly to a forward end that is pivotally coupled onto the rear side of the main blade at a location spaced above a corresponding one of the pivot couplings 50. Hydraulic controls are operatively connected to the tilt actuators to operate the tilt actuators 54 in unison to controllably vary the angular orientation of the main blade relative to the main frame about the common tilt axis of the pivot couplings 50.

The implement further includes two wing blades 56 which are carried on the outer ends of the main blade 22 respectively. The wing blades are fully supported on the main blade such that the wing blades move together with the main blade relative to the main frame about the tilt axis of the pivot couplings under control of the tilt actuators 54.

Each wing blade is shorter in width in the lateral direction than the main blade so as to be less than half the overall width thereof. Each main blade is similar in structure to the main blade by including a front plate 58 defining a leading face of the wing blade which is somewhat concave in profile between the top and bottom edges thereof. The front plate 58 is generally straight in the lateral direction between opposing ends of the wing blade. The leading face terminates along the bottom end thereof at a bottom cutting edge 60 which is straight across the full width of the wing blade. The cutting edge is defined on a replaceable plate protruding below the front plate and which is secured with replaceable fasteners such that the bottom cutting edge can be replaced as it becomes worn. The wing blade 56 further includes a plurality of beams 62 and ribs 64 extending horizontally and vertically across the rear of the front plate 58 to stiffen and strengthen the front plate and define the rigid shape of the wing blade.

A hinge coupling 66 is provided between the inner end of each wing blade and the corresponding outer end of the main blade to define an upright wing axis about which the wing blade is pivotal relative to the main blade to vary the angular orientation of the wing blade relative to the main blade. Each outer end of the main blade and the inner ends of both wing blades comprise a tapered blade end comprised of a front plate 68 and a rear plate 70. The front plate 68 and rear plate 70 joined to the opposing front and rear sides of the blade to extend towards one another while extending laterally towards the upright wing axis such that the front and rear plates 68 and 70 are joined to one another along an upright apex located substantially at the wing axis.

The tapered ends of the blades allow the wing blades to be pivoted relative to the main blade through a large range of angles. More particularly, the wing blade can be pivoted into a forward position in which the wing blades extend forwardly from the main blade generally parallel to the forward working direction and generally perpendicularly to the main blade. The wing blades can also be pivoted into a rearward position extending laterally outwardly from opposing ends of the main blade at a rearward slope which is approximately 30 degrees from a lateral axis of the main blade or 60 degrees from the forward working direction in the illustrated embodiment.

The position of each wing blade is controlled by a respective wing actuator 72 which is operable independently of the other wing actuator. The wing actuators are operatively connected to the respective wing blade through respective wing linkages for controlling the angular orientation of each wing blade relative to the main blade about the respective wing axis. The wing actuator is a hydraulic linear actuator that is similar to the other actuators which can be controlled using hydraulic controls of the towing vehicle.

The wing linkage includes a first link member 74 which is pivotally coupled at a first end onto the rear side of the corresponding wing blade at a location spaced outwardly from the wing axis and which is pivotally coupled at a second end of the first link member to a second end of the hydraulic actuator. The opposing first end of the hydraulic actuator is pivotally coupled to the rear side of the main blade at a location spaced laterally inwardly from the wing axis.

The linkage further includes a second link member 76. The second link member 76 is pivotally coupled at a first end on a rear side of the main blade at a location closer to the wing axis than the pivotal connection of the wing actuator 72 while remaining spaced from the wing axis. The second link member 76 is further pivotally coupled at a second end at an intermediate location along the first link member that is between but spaced from the opposing pivotal connections of the first link member onto the actuator and the rear side of the wing blade respectively.

Extension and retraction of each wing actuator causes the respective wing linkage to be pivoted for movement of the corresponding wing blade between the forward position and the rearward position described above. The hydraulic controls allow the hydraulic actuator 72 to be locked at any selected position between the forward position and rearward position.

The implement further includes a hitch arm 78 which is pivotally coupled at a rear end onto a front end of the main frame for pivotal movement of the hitch arm relative to the main frame about a respective hitch axis which is coaxial with the blade tilt axis. The hitch arm 78 includes a forward portion 80 which is spaced ahead of the main blade and which extends forwardly to a hitch connector 82 at the front end of the hitch arm which is suitable for connection to the towing vehicle.

The hitch arm further includes two rear portions 84 which are joined to the rear end of the forward portion 82 and which extend rearwardly therefrom over top of the main blade along a first portion thereof. The rear portions 84 further extend downwardly from the respective first portions behind the main blade along a second portion thereof. The rear portions 84 terminate at the bottom ends thereof corresponding to the rear end of the hitch arm 78.

The bottom ends form pivotal connections of the hitch arm onto the main frame at laterally spaced positions along the hitch axis. More particularly, the rear portions are parallel and spaced apart from one another by a lateral distance corresponding to the spacing between the main beams of the main frame such that each rear portion 84 of the hitch arm is pivotally connected onto a respective one of the main beams.

Furthermore, each rear portion of the hitch arm is forked at the bottom end thereof to define two side plates 86 which are laterally spaced apart at opposing sides of the corresponding main being 18 so as to be suitably arranged for pivotal connection onto opposing ends of the respective pivot shafts 52 that also serve to pivotally couple the main blade to the main frame. The pivot couplings 50 of the main blade are thus received between the side plates 86 of the rear portions 84 of the hitch arm respectively.

The rear portions 84 are also formed to define an opening 88 therein between the two side plates at a location spaced above the pivot shaft to allow the tilt actuators 54 associated with the main blade to extend through the openings 88 such that pivotal movement of the hitch arm 78 relative to the main frame does not interfere with function of the tilt actuators 54 to control the tilting of the main blade relative to the main shaft.

Two hitch actuators 90 are provided in operative connection between the hitch arm 78 and the main frame for controlling angular orientation of the hitch arm relative to the main frame about the hitch axis which also corresponds to the blade tilt axis. Each hitch actuator is a hydraulic linear actuator under hydraulic control of the towing vehicle. Each hitch actuator is mounted such that one end is pivotally connected to a respective one of the rear portions 84 at a location spaced above the opening 88 while the opposing end is pivotally connected onto the top side of a corresponding one of the main beams 18 at a location spaced rearwardly from the pivotal connection of the corresponding blade tilt actuator 54.

Angularly adjusting the hitch arm 78 relative to the main frame effectively varies the elevation of the hitch connector 82 relative to the main frame which in turn controls the height that the main blade 22 is suspended relative to the ground between the hitch connector 82 at the forward end of the implement and the rear wheels engaged upon the ground at the rear end of the implement. Due to the independent pivotal connection of the hitch arm and the main blade relative to the main frame, the angular orientation of the blade relative to the ground and the height of the blade relative to the ground can be independently controlled.

Using the various hydraulic actuator described above, the main blade and the wing blades can be positioned in a variety of configurations. In a normal configuration for collecting and spreading earth as shown in FIG. 1, the wing blades can be oriented to extend laterally outward at a forward inclination. The bottom cutting edges of the wing blades typically lie perpendicularly to the upright wing axes such that the bottom cutting edges remain within a common plane with the bottom cutting edge of the main blade as the wing blades are pivoted and angularly adjusted relative to the main blade. When the wing blades are pivoted to extend forwardly or rearwardly from the main blade, varying the tilt of the main blade will cause the wing blades to extend forwardly or rearwardly from the main blade at an upward or downward slope depending upon the tilting direction.

Figure 11:
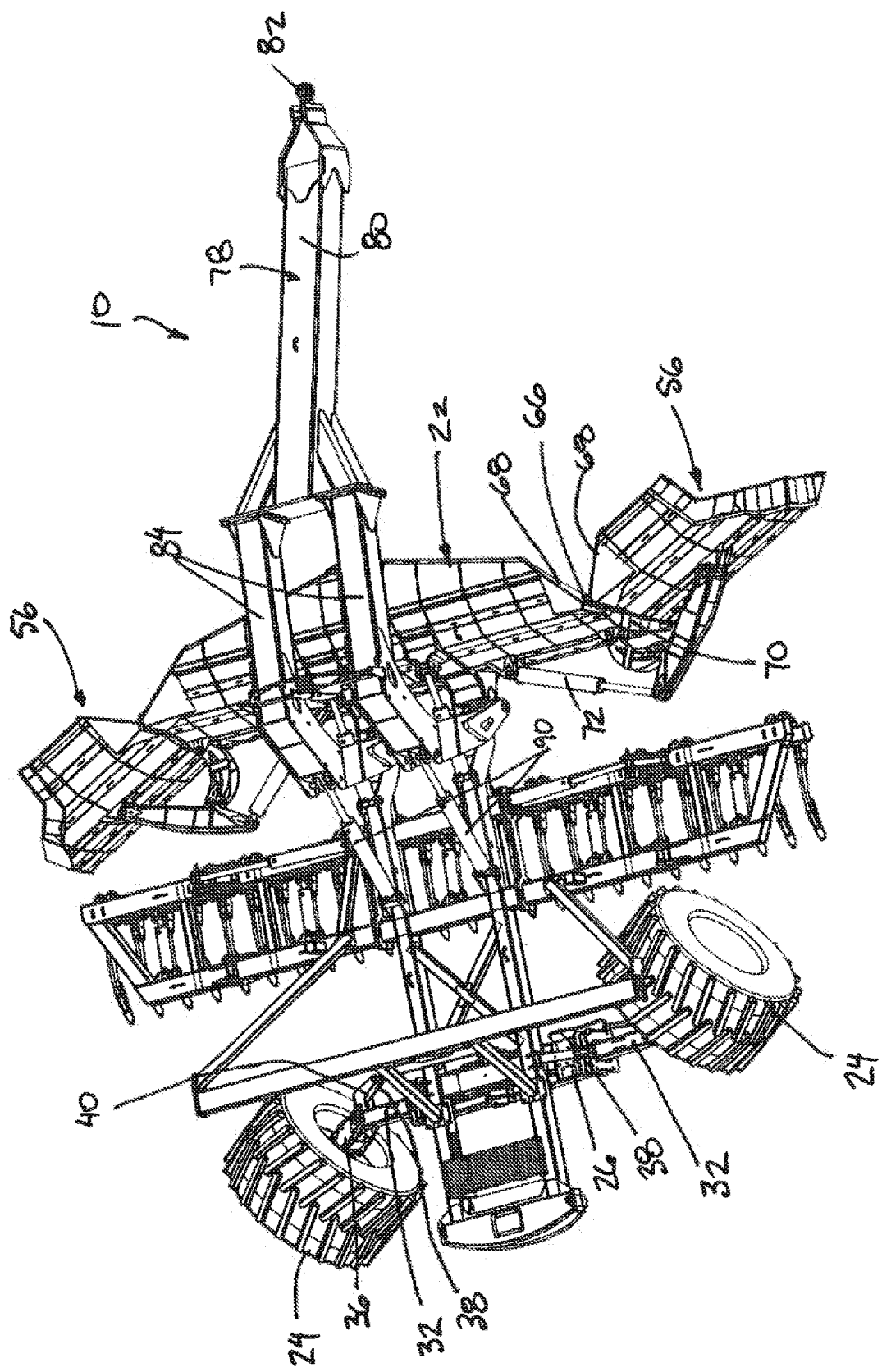
FIGS. 11 and 12 are perspective and rear views respectively of the earth working implement illustrating (i) the rear wheel frame tilted relative to the main frame, (ii) the rear wheels pivoted about their upright steering axes, and (iii) the wing blades independently positioned in forward and rearward orientations respectively.

In some instances the wing blades can be pivoted into different configurations relative to one another as shown in FIG. 11 in which one of the wing blades extends forwardly from the main blade in a leading configuration while the other wing blade extend rearwardly from the main blade in a trailing configuration. In this arrangement, the collection of blades function together to move earth across the blades generally in a common lateral direction from one side of the implement to the other.

When the wing blades are configured as shown in FIG. 11, the engagement of the blades with the ground may cause the implement to be pulled in one lateral direction relative to the towing vehicle. In this instance, it may be desirable to steer the wheels to counter the lateral pulling forces generated by the angled blades moving through the ground also as shown in FIG. 11.

Figure 12:
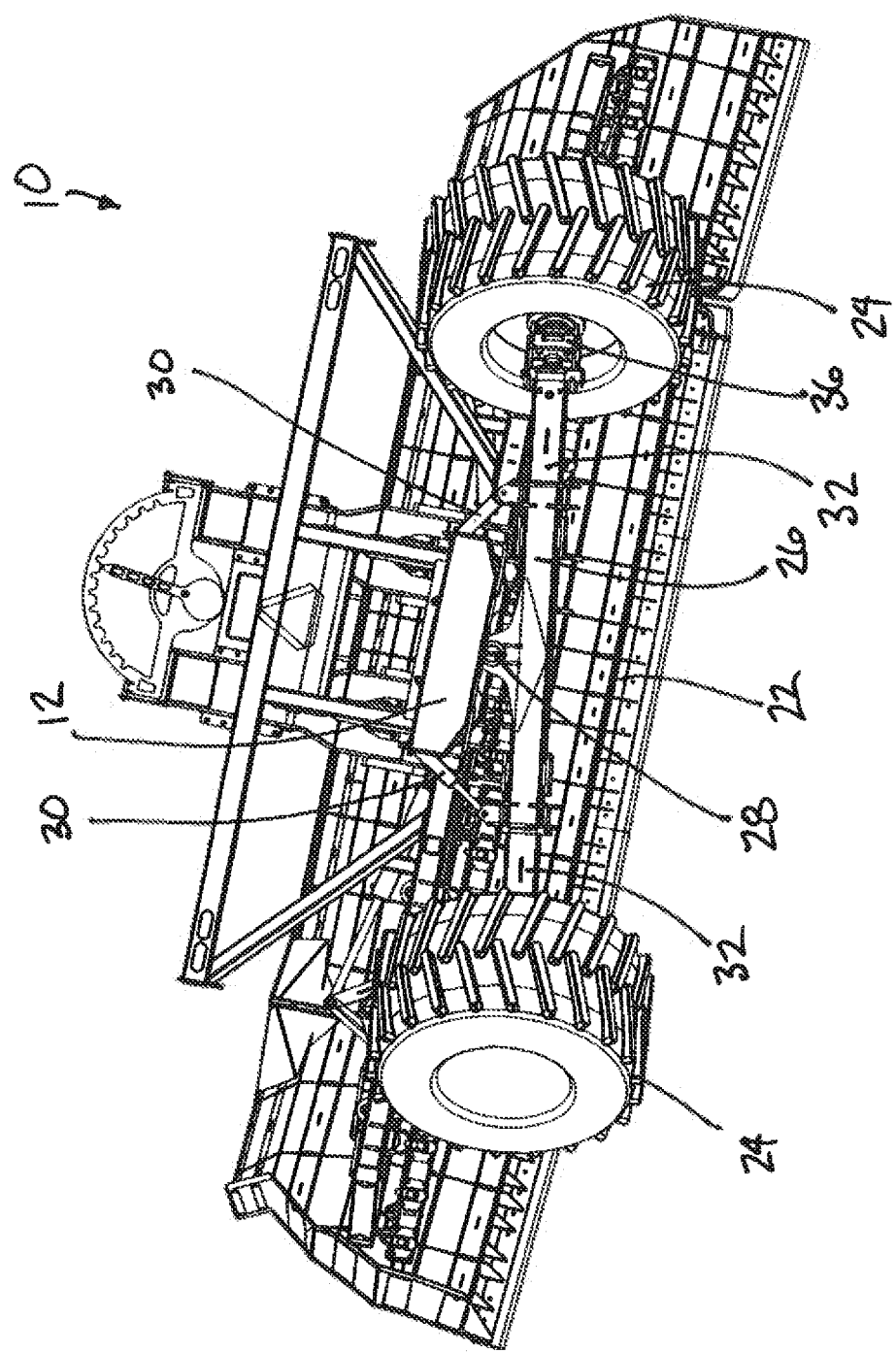

In further instances, it may be desirable to use the implement to form a slope across the full width of the implement. In this instance the wing blades can be straight in line with the main blade, or angularly offset in either forward or rearward directions with the tilt configured so that the bottom cutting edges all lie in a common plane parallel to the ground. The frame actuators 30 may then be used to angularly deflect the rear wheel frame carrying the rear wheels thereon relative to the main frame as shown in FIG. 12.

Figure 13:
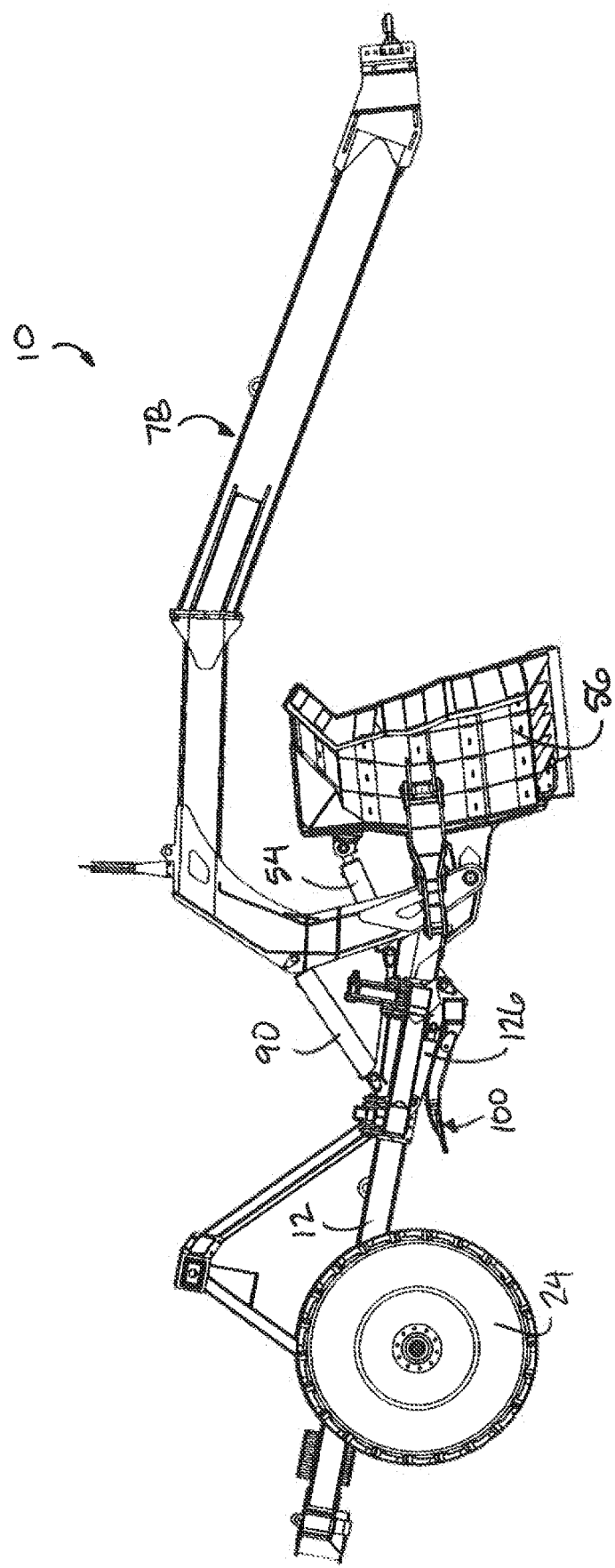
FIG. 13 is a side elevational view of the earth working implement in a forward ditch forming configuration.

As shown in FIG. 13, the implement can also be operated in a forward ditch forming configuration. In this instance the wing blades are both positioned to extend forwardly from the main blade and the main blade is tilted rearwardly so as to extend upwardly at a rearward slope from the bottom cutting edge. In this instance the bottom cutting edges of the wing blades extend laterally outwardly from the main blade at an upward slope from the bottom cutting edge of the main blade. The blades thus collectively form a ditch in the ground when towed in the forward working direction.

Figure 14:
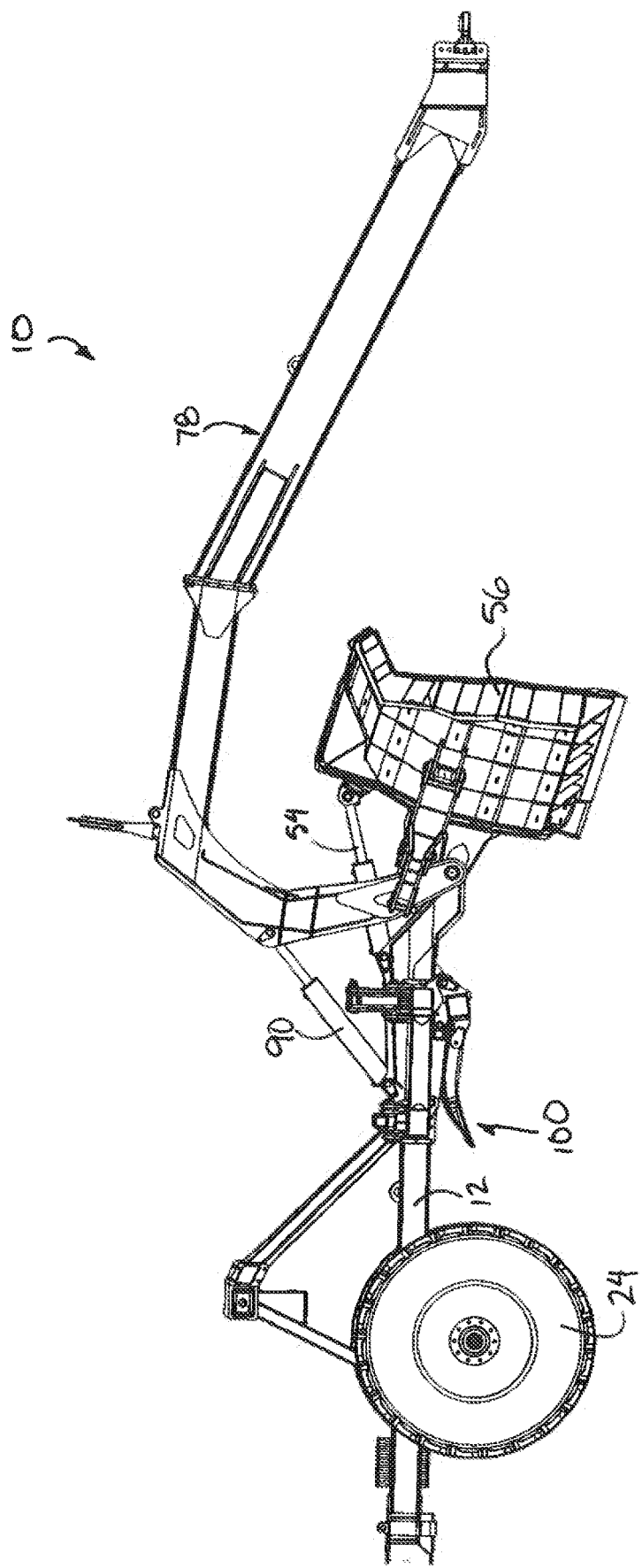
FIG. 14 is a side elevational view of the earth working implement in a ridge forming configuration.

As shown in FIG. 14, the implement can also be operated in a ridge forming configuration. In this instance the wing blades are both positioned to extend forwardly from the main blade; however, the main blade is tilted forwardly in this instance to extend at an upward and forward slope from the bottom cutting edge of the main blade. In this instance the bottom cutting edge of the wing blades extend laterally outwardly from the main blade at a downward slope from the bottom cutting edge of the main blade.

Figure 15:
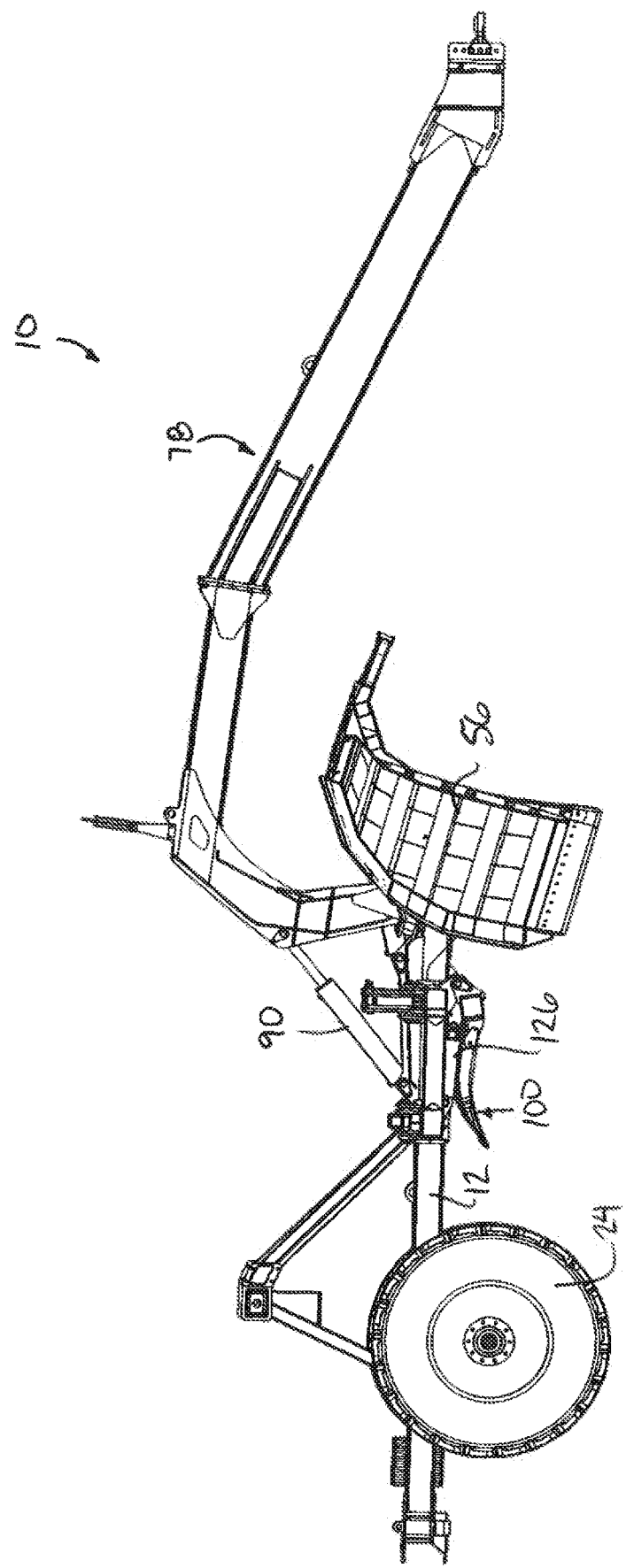
FIG. 15 is a side elevational view of the earth working implement in a rearward ditch forming configuration.
Figure 16:
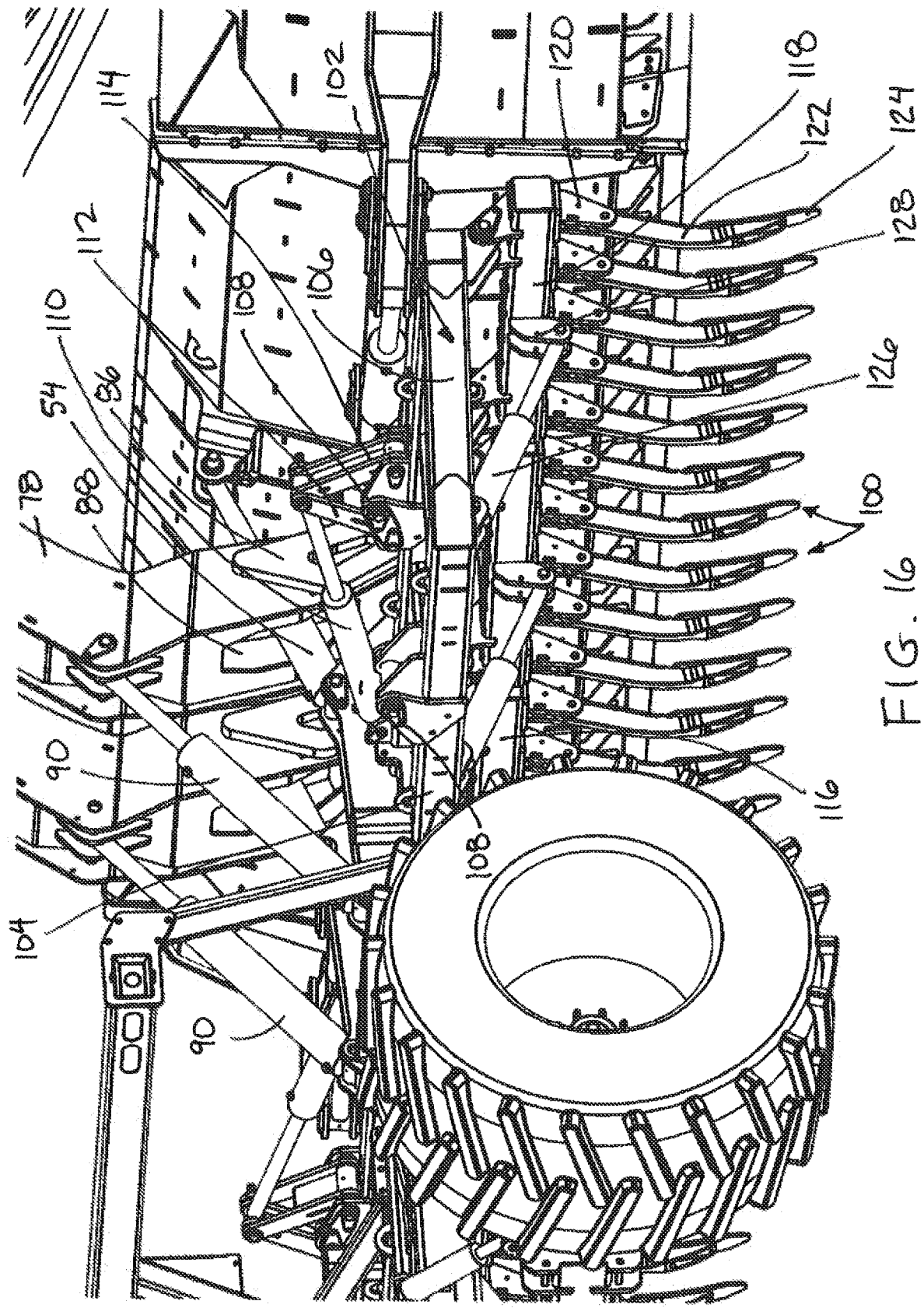
FIG. 16 is an enlarged view of the furrow frame of the earth working implement.

As further shown in FIG. 15, the implement can also be operated in a rearward ditch forming configuration. In this instance the wing blades are both positioned to extend rearwardly from the main blade while the main blade is tilted forwardly to extend upwardly at a forward slope from the bottom cutting edge of the main blade. In this instance the bottom cutting edges of the wing blades extends laterally outwardly from the main blade at an upward slope from the bottom cutting edge of the main blade.

Figure 6:
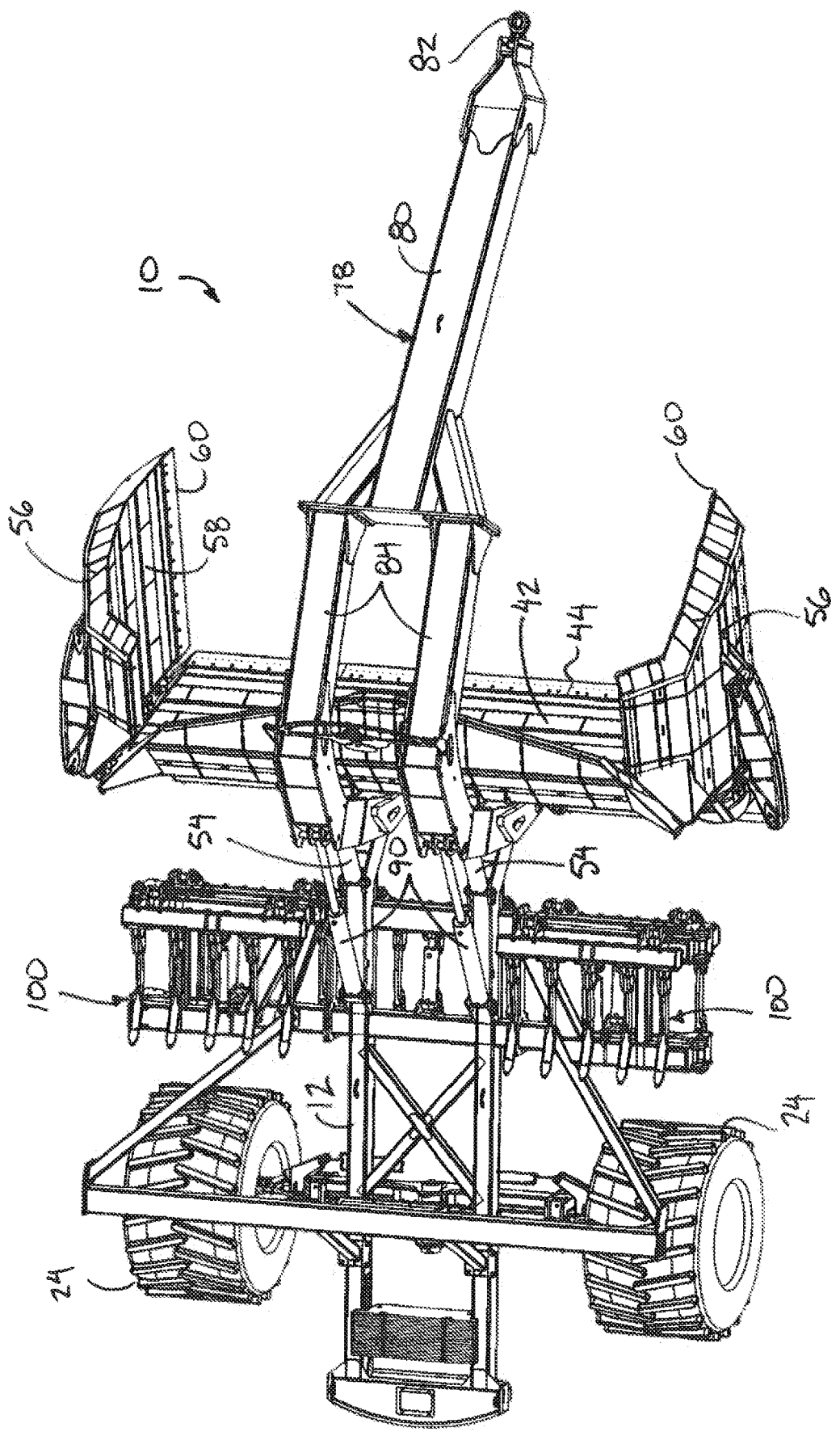
FIGS. 6 and 7 are perspective and top plan views respectively of the earth working implement in a transport configuration.
Figure 7:
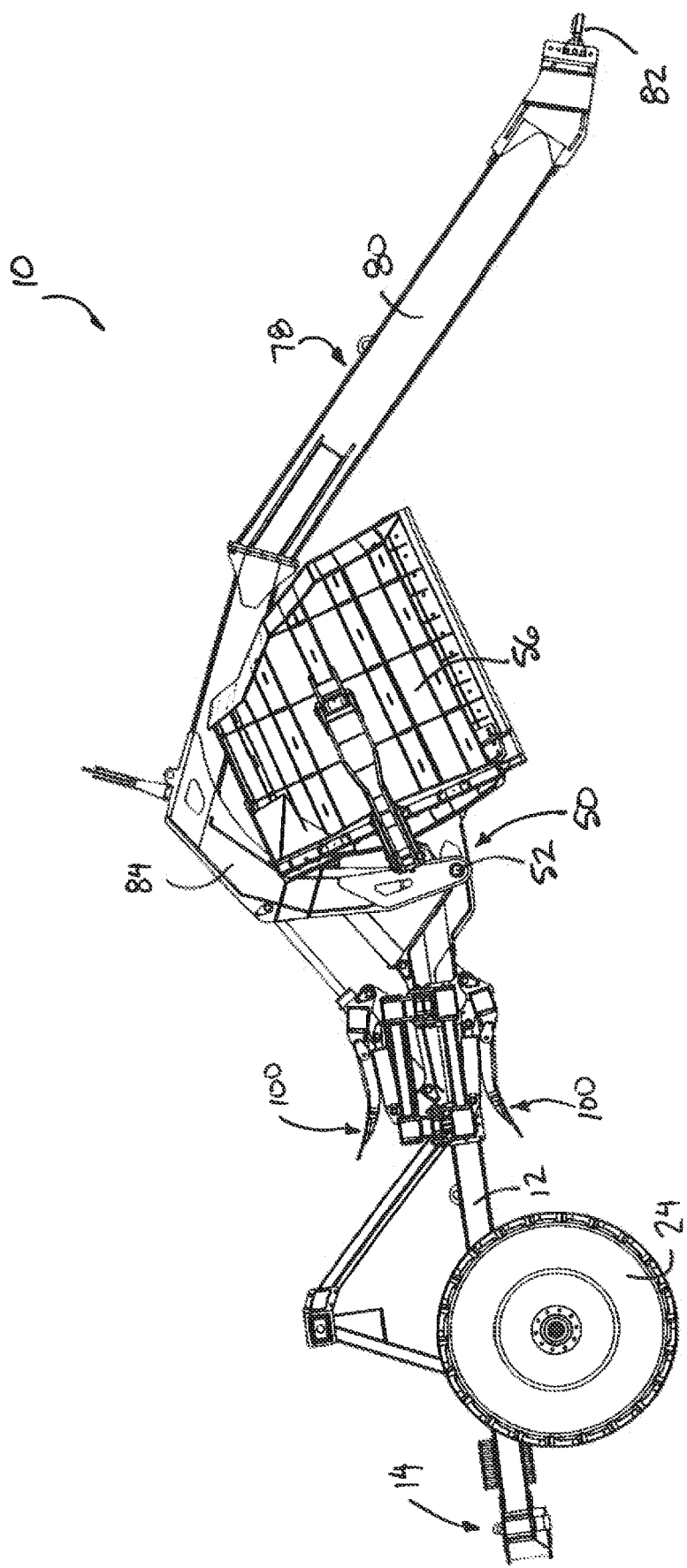
Figure 8:
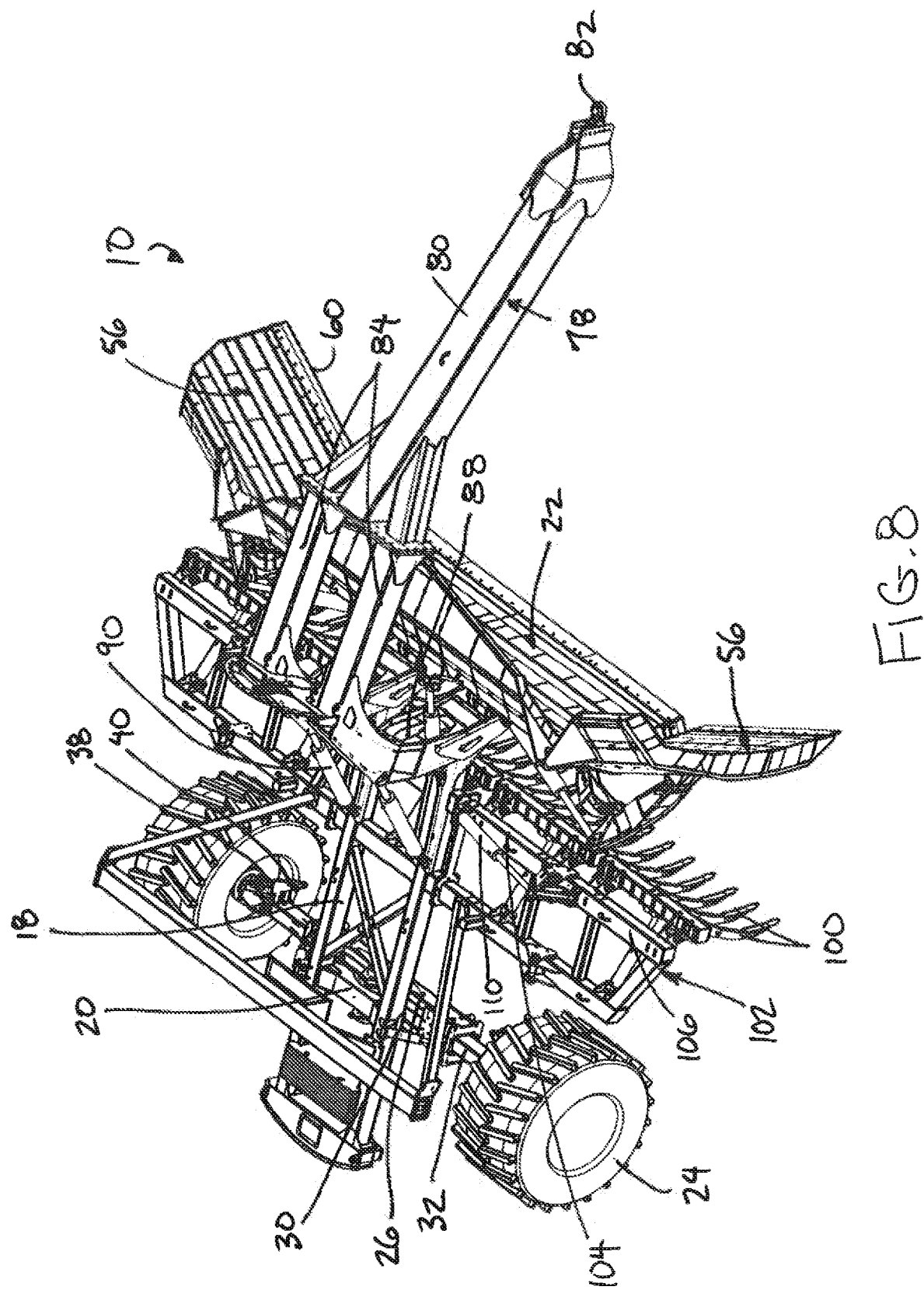
FIGS. 8, 9 and 10 are perspective, side elevational and top plan views respectively of the earth working implement with the furrow openers in a working position.
Figure 9:
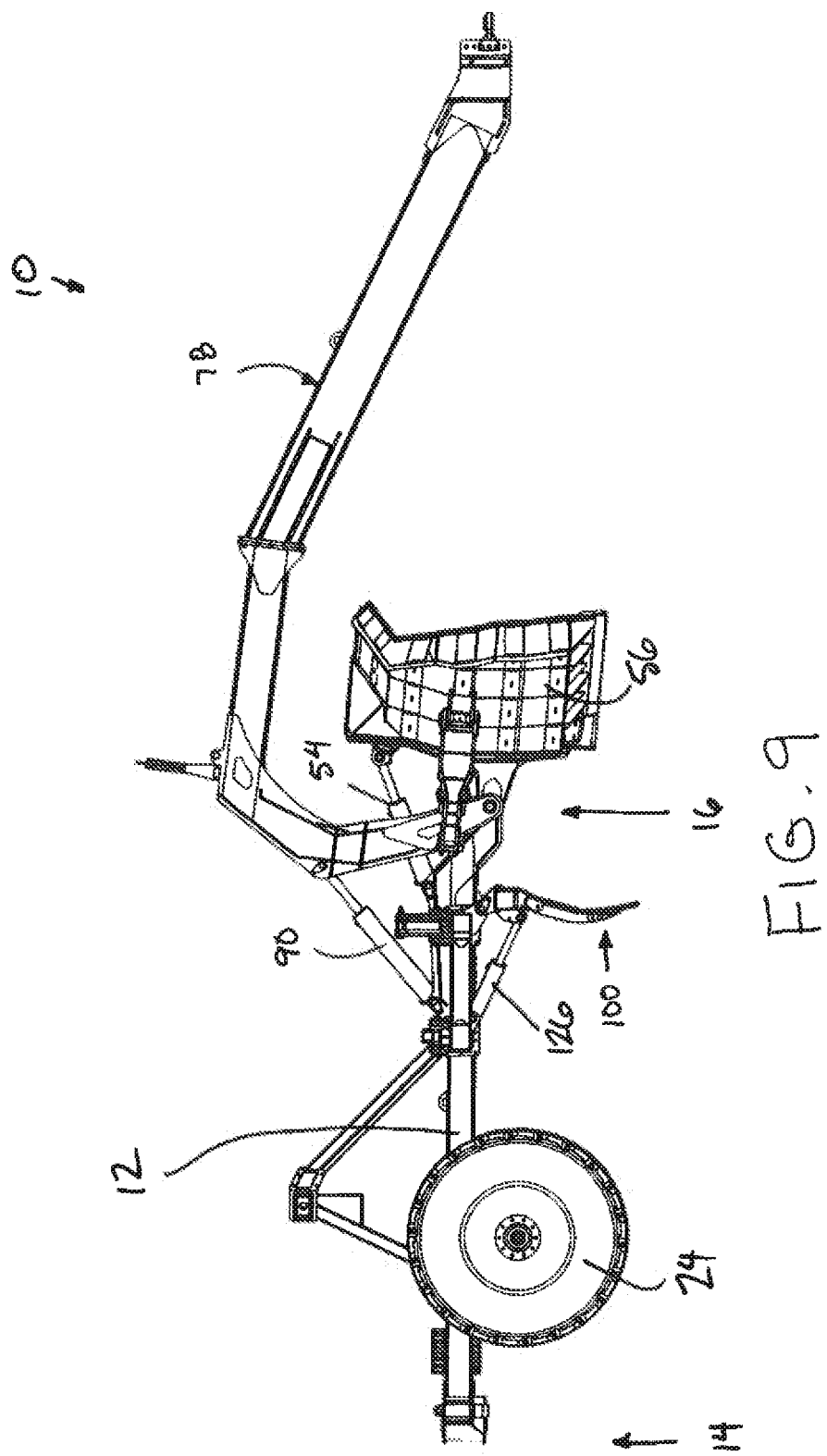
Figure 10:
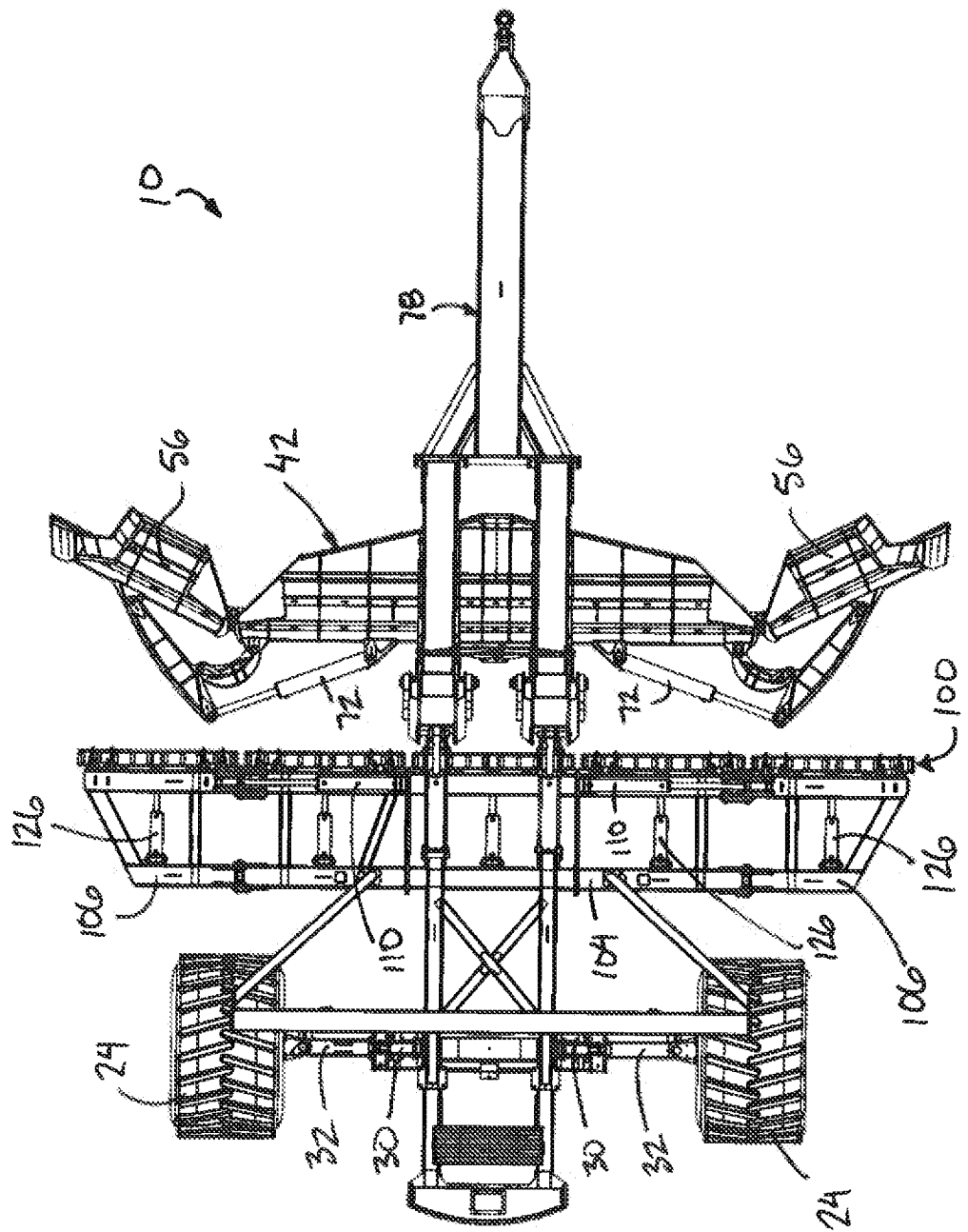

The implement can also be readily positioned in a transport configuration as shown in FIGS. 6 and 7. In this instance, the blade tilt actuators are retracted to cause the bottom cutting edge of the main blade to be pivoted upwardly and forwardly to maximum elevation relative to the main frame. Furthermore, the wing blades are pivoted to the forward position to occupy a minimum lateral width and to similarly be positioned at maximum elevation extending upwardly and forwardly from the bottom edge of the main blade. The hitch actuators in this instance are instead extended to cause the hitch arm to be pivoted downwardly at the hitch connector relative to the main frame to a lowest elevation of the hitch connector relative to the main frame. This causes the front end of the main frame to be pivoted upwardly relative to the rear wheels and the hitch connector to further ensure that the main blade and the wing blades are supported at maximum height spaced above the ground. Other components such as the furrow openers described in further detail below are also arranged in a stored and folded configuration for transport.

Prior to use of the implement for moving earth using the main blade and the wing blades, the implement can instead be used to loosen compacted soil using a plurality of furrow openers 100 which are supported on the main frame by a furrow frame 102. The furrow frame includes a main portion 104 formed by a front beam and a rear beam spanning laterally across the main beams in parallel and longitudinally spaced relation to one another. The front and rear beams of the main portion of the frame span an overall width which is approximately equal to the overall width of the main blade 22. Crossbars are connected between the front and rear beams of the main portion 104 for strength.

The furrow frame 102 also includes two wing portions 106 which are coupled by hinge connections 108 at laterally opposing ends of the main portion 104 of the frame. Each wing portion includes front and rear beams which are aligned with corresponding ones of the front and rear beams of the main portion of the furrow frame and which are interconnected by suitable crossbars to form a rigid frame assembly. Each wing portion 106 is pivotal relative to the main portion about respective fold axes which are parallel to one another and to the forward working direction.

Each wing portion is movable between a normal configuration and a folded configuration. In the normal configuration, each wing portion extends generally laterally outwardly from the main portion so as to be substantially coplanar therewith while spanning a width in the lateral direction which is approximately equal to a lateral width of the wing blade when the wing blade is positioned at a 45 degrees slope from the forward working direction. In the folded configuration, each wing portion is pivoted upwardly and inwardly relative to the main portion 104 so as to overlap in parallel relation over top of the main portion of the furrow frame.

Folding of the furrow frame is accomplished by a pair of fold actuators 110. Each fold actuator 110 is a hydraulic linear actuator which is controlled by hydraulic controls of the towing vehicle. Each fold actuator 110 is pivotally connected at a first end onto the main portion 104 of the furrow frame at a location spaced inwardly from the respective fold axis while being pivotally connected at an opposing second end on a folding linkage connected between the main portion and the corresponding wing portion 106 of the furrow frame.

More particularly, the folding linkage includes a first link 112 pivoted at a first end on the main portion 104 and pivoted at the opposing end to the end of the corresponding actuator 110 at a location spaced above the fold axis in the normal configuration. The folding linkage also includes a second link 114 that is pivotally connected at a first end on the wing portion 106 and pivoted at the opposing end to the end of the corresponding actuator 110 at the same location as the first link 112. In this manner retracting each fold actuator 110 causes the folding linkage to be pulled inwardly to cause folding of the linkage and to cause the corresponding wing portion 106 to be folded inwardly over top of the corresponding end of the main portion 104 of the furrow frame.

The furrow openers 100 are supported at laterally spaced apart positions along a toolbar formed in three or more sections which are aligned with one another in the normal configuration of the furrow frame with the wing portions unfolded. More particularly, the toolbar includes one or more main sections 116 which are supported below the main portion 104 of the furrow frame to span the full width thereof corresponding to the width of the main blade 22 in the lateral direction. The toolbar also includes two wing sections 118 which are supported on the two wing portions 106 of the furrow frame respectively. A plurality of the openers 100 are supported along each toolbar section.

Each furrow opener 100 includes a mounting arrangement 120 that supports the opener on the toolbar. A shank 122 extends downward in a normal working position from the mounting arrangement to support a shovel 124 on the bottom end of the shank. The shovel cuts into the ground to form a furrow in the ground in use. The shank 122 is mounted onto the mounting arrangement 120 by a pivot shaft. The mounting arrangement further includes a trip mechanism with a spring arranged to hold the shank and the shovel 124 at the bottom end thereof in fixed relation to the frame unless a prescribed holding force of the trip mechanism is exceeded, at which point the shank can be deflected upwardly and rearwardly over an obstacle, while the spring returns the shank to the undeflected normal working position thereof.

The toolbar sections are each supported on the respective portion of the furrow frame so as to be pivotal through a range of approximately 90 degrees between a working position of the furrow openers in which the opener shanks extend downward from the toolbars in the undeflected positions thereof and a stored position in which the opener shanks extend rearward from the toolbars in the undeflected positions thereof.

Each toolbar section is hinged on to the respective portion of the furrow frame while being operatively connected to an opener actuator 126 to control the position of the furrow openers between the working and stored positions thereof. Each toolbar section includes a crank arm 128 fixed onto the toolbar to extend radially outward therefrom so that the respective opener actuator 126 of that section of the toolbar can be pivotally connected at opposing ends between the crank arm 128 and the respective portion of the furrow frame. The opener actuator 126 is a hydraulic linear actuator under control of the hydraulic controls of the towing vehicle so that extending and retracting the actuators 126 causes the openers 100 to be displaced between the working and stored positions thereof. The opener actuators 126 may be operated together, or in some instances the main section can be operated in the working position while one or both wings remains in the stored position for breaking up a narrower path of soil if desired.

In the working position, the furrow openers protrude below the bottom cutting edge of the main blade and the wing blades so that the furrow openers can be embedded into the ground to form furrows in the ground while the main blade remains out of use and disengaged from the ground as the implement is towed across the ground in the forward working direction.

In use, an operator may position some or all of the furrow openers in the working position thereof while the blades are disengaged from the ground so that towing the implement across the ground primarily breaks up compacted soil without substantially moving the earth in a first pass over the ground. The operator then raises the furrow openers into the stored position thereof and then the blades are positioned in the desired configuration to engage the ground and move earth across the ground in the desired manner in a second pass over the same patch of ground once the earth has been loosened up.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An earth working implement for moving earth when towed across ground in a forward working direction by a towing vehicle, the earth working implement comprising:
    a main frame defining a longitudinal axis extending in the forward working direction from a rear end to a front end of the frame;
    a main blade supported on the main frame, the main blade having a leading face that is upright in orientation and that terminates at a bottom cutting edge oriented in a lateral direction transversely to the forward working direction;
    the main blade being pivotal relative to the main frame about a tilt axis oriented in the lateral direction, the tilt axis being located rearwardly of the leading face of the main blade;
    a tilt actuator operatively connected between the main blade and the main frame so as to controllably vary angular orientation of the main blade relative to the main frame about the tilt axis;
    two rear wheels operatively connected to the main frame at a location spaced rearwardly from the main blade so as to be arranged to support the main frame for rolling movement along the ground in the forward working direction;
    a hitch arm connected to the main frame for pivotal connection relative to the main frame about a hitching axis oriented in the lateral direction;
    the hitch arm extending in the forward working direction from the hitching axis to a hitch connector at a forward end of the hitch arm that is arranged for connection to the towing vehicle;
    a hitch actuator operatively connected between the hitch arm and the main frame so as to controllably vary angular orientation of the hitch arm relative to the main frame about the hitching axis;
    wherein the angular orientation of the main blade relative to the main frame and the angular orientation of the hitch arm relative to the main frame are adjustable independently of one another by the tilt actuator and the hitch actuator respectively.

2. The implement according to claim 1 wherein the tilt axis and the hitch axis are coaxial with one another.

3. The implement according to claim 1 wherein the hitch arm comprises a forward portion supporting the hitch connector thereon and two rearward portions extending rearwardly and downwardly from the forward portion, the two rearward portions being pivotally coupled to the main frame at laterally spaced apart locations along the hitch axis.

4. The implement according to claim 1 further comprising a pair of wing blades supported at laterally opposing ends of the main blade respectively, each wing blade having a leading face extending upwardly from a bottom cutting edge of the wing blade, each wing blade being pivotal relative to the main blade about a respective upright wing axis so as to vary an angular orientation of the bottom cutting edge of the wing blade relative to the bottom cutting edge of the main blade, and each wing blade being carried on the main blade so as to be pivotal relative to the main frame about the tilt axis together with the main blade under control of the tilt actuator.

5. The implement according to claim 1 further comprising:
    a plurality of furrow openers supported on the main frame at spaced apart positions relative to one another in the lateral direction;
    the furrow openers being movable between a working position and a stored position;
    the furrow openers in the working position protruding below the bottom cutting edge of the main blade so as to be arranged to form respective furrows in the ground as the implement is displaced across the ground in the forward working direction; and
    the furrow openers in the storage position being spaced above the bottom cutting edge of the main blade such that the furrow openers do not engage the ground as the implement is displaced across the ground in the forward working direction.

6. The implement according to claim 5 wherein the furrow openers are supported on the main frame at a location spaced rearwardly from the main blade.

7. The implement according to claim 1 further comprising a rear wheel frame coupled to the main frame and supporting the two rear wheels thereon, the rear wheels being pivotal together with the rear wheel frame relative to the main frame about a frame axis oriented in the forward working direction.

8. The implement according to claim 7 further comprising at least one frame actuator operatively connected between the main frame and the rear wheel frame so as to be arranged to controllably vary an angular orientation of the rear wheel frame relative to the main frame about the frame axis.

9. The implement according to claim 1 further comprising a rear wheel frame coupled to the main frame and two extension frames supporting the two rear wheels on the rear wheel frame respectively, the extension frames being slidable relative to the rear wheel frame in the lateral direction so as to be arranged to vary a width between the rear wheels in the lateral direction.

10. The implement according to claim 1 further comprising a rear wheel frame coupled to the main frame and two axle bodies supporting the two rear wheels relative to the rear wheel frame respectively, each axle body being pivotal relative to the rear wheel frame about a respective upright steering axis, the axle body rotatably supporting the respective wheel thereon such that the rear wheel and the axle body are pivotal together relative to the rear wheel frame about the upright steering axis.

11. An earth working implement for moving earth when towed across ground in a forward working direction by a towing vehicle, the earth working implement comprising:
a main frame defining a longitudinal axis extending in the forward working direction from a rear end to a front end of the frame;
a main blade supported on the main frame, the main blade having a leading face that is upright in orientation and that terminates at a bottom cutting edge oriented in a lateral direction transversely to the forward working direction;
the main blade being pivotal relative to the main frame about a tilt axis oriented in the lateral direction, the tilt axis being located rearwardly of the leading face of the main blade;
a tilt actuator operatively connected between the main blade and the main frame so as to controllably vary angular orientation of the main blade relative to the main frame about the tilt axis;
two rear wheels operatively connected to the main frame at a location spaced rearwardly from the main blade so as to be arranged to support the main frame for rolling movement along the ground in the forward working direction;
a hitch arm connected to the main frame extending in the forward working direction to a hitch connector at a forward end of the hitch arm that is arranged for connection to the towing vehicle;
a pair of wing blades supported at laterally opposing ends of the main blade respectively, each wing blade having a leading face extending upwardly from a bottom cutting edge of the wing blade, each wing blade being pivotal relative to the main blade about a respective upright wing axis so as to vary an angular orientation of the bottom cutting edge of the wing blade relative to the bottom cutting edge of the main blade, and each wing blade being carried on the main blade so as to be pivotal relative to the main frame about the tilt axis together with the main blade under control of the tilt actuator;
wherein each wing blade includes a wing linkage pivotally coupled between the main blade and the wing blade, the wing linkage including (i) at least one pivotal link member and (ii) a wing actuator operatively connected with the at least one pivotal link member between the wing blade and the main blade so as to controllably vary angular orientation of the wing blade relative to the main blade about the upright axis;
the wing actuators and the wing linkage being operable to displace the wing blades between a forward position extending forwardly of the main blade and a rearward position extending laterally outward from the main blade at a rearward slope.

12. The implement according to claim 11 wherein each wing blade is pivotal into the forward position so as to be oriented substantially parallel to the forward working direction in the forward position.

13. The implement according to claim 11 wherein:
the at least one pivotal link member includes a first link member and a second link member;
the first link member is pivotally coupled at a first end of the first link member on a rear side of the wing blade;
the wing actuator is a linear actuator pivotally coupled at a first end of the wing actuator on a rear side of the main blade and pivotally coupled at a second end on the first link member spaced from the first end of the first link member; and
the second link member is pivotally coupled at a first end of the second link member at a rear side of the main blade at a location spaced from the respective wing axis and pivotally coupled at a second end of the second link member on the first link member at an intermediate location between first end of the first link member and the second end of the wing actuator.

14. The implement according to claim 11 wherein each wing blade is pivotal into the rearward position such that the rearward slope is oriented less than 70 degrees from the forward working direction.

15. The implement according to claim 14 wherein the rearward slope of each wing blade in the rearward position is approximately 60 degrees from the forward working direction.

16. The implement according to claim 11 wherein the implement is operable in a ridge forming configuration wherein the wing blades are positioned to extend forwardly from the main blade and the main blade is tilted forwardly from the bottom cutting edge of the main blade such that the bottom cutting edges of the wing blades extend laterally outwardly from the main blade at a downward slope from the bottom cutting edge of the main blade.

17. The implement according to claim 11 wherein the implement is operable in a rearward ditch forming configuration wherein the wing blades are positioned to extend rearwardly from the main blade and the main blade is tilted forwardly from the bottom cutting edge of the main blade such that the bottom cutting edges of the wing blades extend laterally outwardly from the main blade at an upward slope from the bottom cutting edge of the main blade.

18. The implement according to claim 11 wherein the implement is operable in a forward ditch forming configuration wherein the wing blades are positioned to extend forwardly from the main blade and the main blade is tilted rearwardly from the bottom cutting edge of the main blade such that the bottom cutting edges of the wing blades extend laterally outwardly from the main blade at an upward slope from the bottom cutting edge of the main blade.

19. An earth working implement for moving earth when towed across ground in a forward working direction by a towing vehicle, the earth working implement comprising:
a main frame defining a longitudinal axis extending in the forward working direction from a rear end to a front end of the frame;
a main blade supported on the main frame, the main blade having a leading face that is upright in orientation and that terminates at a bottom cutting edge oriented in a lateral direction transversely to the forward working direction;
the main blade being pivotal relative to the main frame about a tilt axis oriented in the lateral direction, the tilt axis being located rearwardly of the leading face of the main blade;
a tilt actuator operatively connected between the main blade and the main frame so as to controllably vary angular orientation of the main blade relative to the main frame about the tilt axis;
two rear wheels operatively connected to the main frame at a location spaced rearwardly from the main blade so as to be arranged to support the main frame for rolling movement along the ground in the forward working direction;

a hitch arm connected to the main frame and extending in the forward working direction from the main frame to a hitch connector at a forward end of the hitch arm that is arranged for connection to the towing vehicle; and a pair of wing blades supported at laterally opposing ends of the main blade respectively, each wing blade having a leading face extending upwardly from a bottom cutting edge of the wing blade, each wing blade being pivotal relative to the main blade about a respective upright wing axis so as to vary an angular orientation of the bottom cutting edge of the wing blade relative to the bottom cutting edge of the main blade, and each wing blade being carried on the main blade so as to be pivotal relative to the main frame about the tilt axis together with the main blade under control of the tilt actuator;

the implement being operable in a forward ditch forming configuration wherein the wing blades are positioned to extend rearwardly from the main blade and the main blade is tilted forwardly from the bottom cutting edge of the main blade such that the bottom cutting edges of the wing blades extend laterally outwardly from the main blade at an upward slope from the bottom cutting edge of the main blade; and the implement being operable in a rearward ditch forming configuration wherein the wing blades are positioned to extend forwardly from the main blade and the main blade is tilted rearwardly from the bottom cutting edge of the main blade such that the bottom cutting edges of the wing blades extend laterally outwardly from the main blade at an upward slope from the bottom cutting edge of the main blade.

20. An earth working implement for moving earth when towed across ground in a forward working direction by a towing vehicle, the earth working implement comprising:
a main frame defining a longitudinal axis extending in the forward working direction from a rear end to a front end of the frame;
a main blade supported on the main frame, the main blade having a leading face that is upright in orientation and that terminates at a bottom cutting edge oriented in a lateral direction transversely to the forward working direction;
the main blade being pivotal relative to the main frame about a tilt axis oriented in the lateral direction, the tilt axis being located rearwardly of the leading face of the main blade;
a tilt actuator operatively connected between the main blade and the main frame so as to controllably vary angular orientation of the main blade relative to the main frame about the tilt axis;
two rear wheels operatively connected to the main frame at a location spaced rearwardly from the main blade so as to be arranged to support the main frame for rolling movement along the ground in the forward working direction;
a hitch arm connected to the main frame and extending in the forward working direction from the main frame to a hitch connector at a forward end of the hitch arm that is arranged for connection to the towing vehicle; and
a plurality of furrow openers supported on the main frame at spaced apart positions relative to one another in the lateral direction;
the furrow openers being movable between a working position and a stored position;
the furrow openers in the working position protruding below the bottom cutting edge of the main blade so as to be arranged to form respective furrows in the ground as the implement is displaced across the ground in the forward working direction; and
the furrow openers in the storage position being spaced above the bottom cutting edge of the main blade such that the furrow openers do not engage the ground as the implement is displaced across the ground in the forward working direction;
wherein the furrow openers are supported on the main frame at a location spaced rearwardly from the main blade.

21. The implement according to claim 20 wherein the furrow openers are spaced apart along a toolbar that spans a full width of the main blade in the lateral direction.

22. The implement according to claim 20 wherein the furrow openers are spaced apart along a toolbar, and wherein the toolbar is pivotal about a toolbar axis oriented in the lateral direction as the furrow openers are displaced between the working position and the stored position thereof.

23. The implement according to claim 20 wherein the furrow openers are supported on a furrow frame including a main portion and two wing portions extending laterally outwardly from opposing ends of the main portion in a wide configuration of the wing portions, each of the main portion and the wing portions of the furrow frame supporting a plurality of the furrow openers thereon, the wing portions of the furrow frame being pivotal about respective furrow frame axes oriented in the forward working direction from the wide configuration upwardly and inwardly towards a narrow configuration.

24. The implement according to claim 23 wherein the furrow openers are supported laterally spaced apart along a toolbar, the toolbar including a main section supported on the main portion of the furrow frame and two wing sections supported on the wing portions of the furrow frame, each section of the toolbar being pivotal relative to the respective portion of the furrow frame about a toolbar axis oriented in the lateral direction as the furrow openers are displaced between the working position and the stored position thereof.

* * * * *